United States Patent [19]

Inoue et al.

[11] Patent Number: 5,541,859
[45] Date of Patent: Jul. 30, 1996

[54] SPEED DETECTING APPARATUS FOR ROTATING BODY

[75] Inventors: Yuuichi Inoue, Tokai; Shusaku Fujimoto, Okazaki; Kenji Tomiita, Ichinomiya,; Nobuyoshi Onogi, Nagoya, all of Japan

[73] Assignee: Nippondenso Co., Ltd., Kariya, Japan

[21] Appl. No.: 215,763

[22] Filed: Mar. 22, 1994

[30] Foreign Application Priority Data

Mar. 23, 1993 [JP] Japan .................................. 5-063882
Apr. 27, 1993 [JP] Japan .................................. 5-100840

[51] Int. Cl.⁶ .................................................. G01P 11/00
[52] U.S. Cl. .................................. 364/565; 73/146.5
[58] Field of Search .............................. 364/565, 426.01, 364/426.02, 424.05, 558, 550; 180/41; 73/146, 146.5

[56] References Cited

U.S. PATENT DOCUMENTS

| | | | |
|---|---|---|---|
| 4,670,852 | 6/1987 | Masaki et al. | 364/565 |
| 5,174,598 | 12/1992 | Sato et al. | 364/424.05 |
| 5,179,526 | 1/1993 | Zimmer et al. | 364/565 |
| 5,218,862 | 6/1993 | Hurrell, II et al. | 73/146.5 |
| 5,248,957 | 9/1993 | Walker et al. | 364/565 |
| 5,255,191 | 10/1993 | Fulks | 364/424.05 |

FOREIGN PATENT DOCUMENTS 63-172966  7/1988  Japan .

*Primary Examiner*—Emmanuel T. Voeltz
*Assistant Examiner*—Edward Pipala
*Attorney, Agent, or Firm*—Cushman Darby & Cushman, L.L.P.

[57] ABSTRACT

In a speed detecting apparatus for a rotating body, a correction coefficient is used to correct a detecting error in each of pulse signal periods representing speed data of the rotating body. The correction coefficient is updated so as to cancel an aberration of the corresponding pulse signal period caused by a nonstandard factor of the rotating body. Specifically, an average value of the pulse signal periods corresponding to one rotation of the rotating body is first derived, then a value indicative of a deviation between corresponding one of the pulse signal periods and the average value is derived, and further, an updating value is derived by adjusting a degree of influence of the deviation indicative value to the correction coefficient using a correction sensitivity coefficient. The correction coefficient is updated by adding the updating value to a last value of the correction coefficient.

18 Claims, 35 Drawing Sheets

NEWEST SERIES OF 48 PULSE SIGNALS

SPEED DETECTING APPARATUS FOR ROTATING BODY

BACKGROUND OF THE INVENTION

1. Field of the Invention

The present invention relates to an apparatus for detecting a speed of a rotating body.

2. Description of the Prior Art

Conventionally, for detecting a speed of a rotating body, a rotation distance of the rotating body is first derived based on a given standard value of rotation detecting sections of a rotary element forming a portion of the rotating body and a portion of a speed sensor and the number of input times of pulse signals derived from an output of the speed sensor. The speed of the rotating body is then derived based on this derived rotation distance and periods of the input pulse signals. However, the signal period is subject an aberration caused by a nonstandard factor or element, such as, deformation of the rotation detecting sections due to a processing failure or due to corrosion, or a rotational speed variation of the rotating body due to deformation thereof.

In consideration of the foregoing, Japanese First (unexamined) Patent Publication No. 63-172966 discloses the following vehicle wheel speed detecting apparatus:

In the speed detecting apparatus of this publication, a rotation sensor includes a sensor rotor having the given number of teeth as rotation detecting sections and arranged to co-rotate with a vehicle wheel, and sequentially produces pulse signals corresponding to the teeth of the sensor rotor. During the brake being released, the newest signal period is compared with the last and before-last signal periods so as to derive a correction coefficient for correcting the newest signal period. Accordingly, the correction coefficients are derived in sequence corresponding to the teeth of the sensor rotor, respectively. On the other hand, during the brake being applied, the newest signal period is corrected based on the correction coefficient which was derived for the corresponding tooth of the sensor rotor immediately before the start of applying the brake.

However, the foregoing speed detecting apparatus has the following problem:

Specifically, when, for example, vibration indicative pulse signals which vary at random are inputted, since the foregoing correction coefficients also vary at random, a detection error of the signal period caused by the above-noted nonstandard factor can not be corrected based on such a correction coefficient whether the brake is applied or released.

SUMMARY OF THE INVENTION

Therefore, it is an object of the present invention to provide an improved speed detecting apparatus for a rotating body.

It is another object of the present invention to provide an improved speed detecting apparatus which is capable of detecting a speed of a rotating body by correcting a detection error of a signal period which is caused due to a nonstandard factor or element.

According to one aspect of the present invention, a speed detecting apparatus/or a rotating body, in which a correction coefficient is used to correct a detection error in each of pulse signals sequentially produced depending on rotation of the rotating body, the detection error caused by a nonstandard factor of the rotating body, so as to derive speed data of the rotating body based on the corrected pulse signals, comprises updating means for updating the correction coefficient, the updating means including average deriving means for deriving a value indicative of an average of periods of the pulse signals; deviation deriving means for deriving a value indicative of a deviation between corresponding one of the pulse signal periods and the average indicative value; adjusting means for adjusting a degree of influence of the deviation indicative value to the correction coefficient relative to one input of the pulse signal so as to derive an updating value for the correction coefficient; and correction coefficient deriving means for deriving an updated value of the correction coefficient by adding the updating value to a last value of the correction coefficient.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings.

DESCRIPTION OF THE PREFERRED EMBODIMENT

Now, preferred embodiments of the present invention will be described with reference to the accompanying drawings, wherein the present invention is applied to a speed detecting apparatus for a vehicle wheel.

Figure 1:
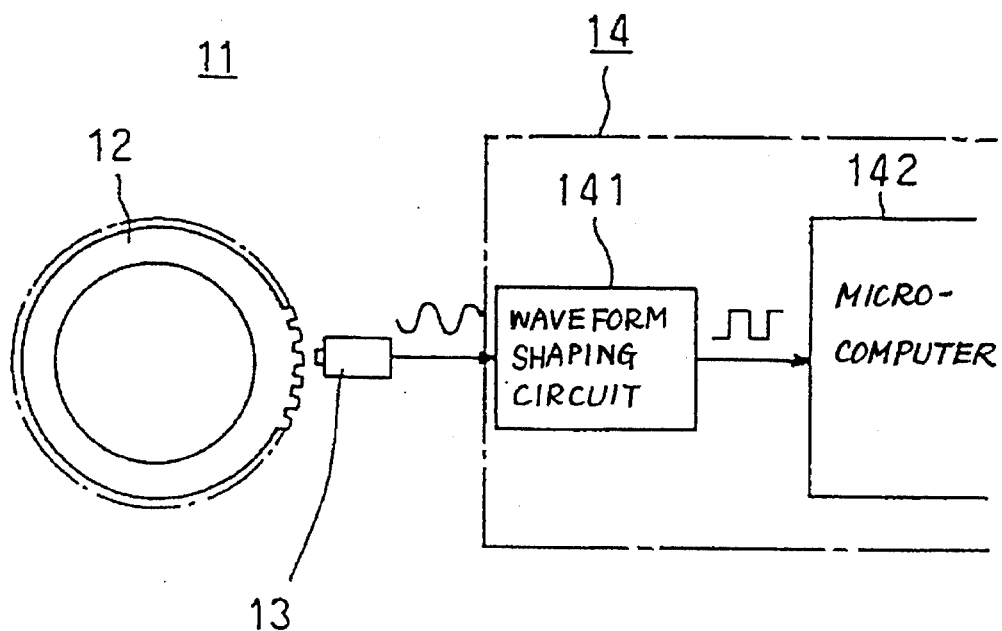
FIG. 1 is a diagram showing the structure of a speed detecting apparatus for a rotating body according to a first preferred embodiment of the present invention.

FIG. 1 is a diagram showing the structure of the wheel speed detecting apparatus 11 according to a first preferred embodiment of the present invention. In FIG. 1, the apparatus 11 includes a signal rotor 12 which is in the form of a toothed wheel and arranged to co-rotate with the vehicle wheel. The signal rotor 12 is formed on its outer periphery with a large number of teeth (48 teeth in this preferred embodiment) each made of a magnetic material. These teeth are arranged at regular intervals. An electromagnetic pickup 13 is fixedly disposed close to the toothed outer periphery of the signal rotor 12. The electromagnetic pickup 13 detects a change of a magnetic field each time one of the teeth of the signal rotor 12 passes thereby. Accordingly, the signal rotor 12 and the pickup 13 cooperatively constitutes a speed sensor for the vehicle wheel, and the teeth of the signal rotor 12 work as rotation detecting sections of the speed sensor. For example, the electromagnetic pickup 13 outputs one detection signal in a sine waveform each time one of the teeth of the signal rotor 12 passes thereby. The detection signals are inputted in sequence to an electronic control unit (ECU) 14. As shown in FIG. 1, the ECU 14 includes a waveform shaping circuit 141 which receives the detection signals in sequence to shape them into corresponding rectangular pulse signals, and a microcomputer 142 which receives the shaped pulse signals from the waveform shaping circuit 141. The ECU further includes, such as, a ROM and a RAM as in the known manner.

Figure 2:
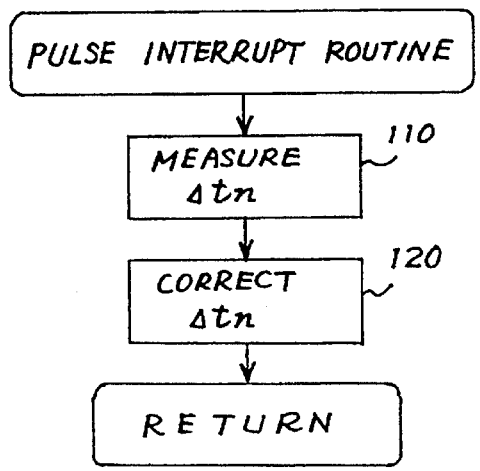
FIG. 2 is a flowchart showing a pulse interrupt routine for correcting a signal period according to the first preferred embodiment.
Figure 3:
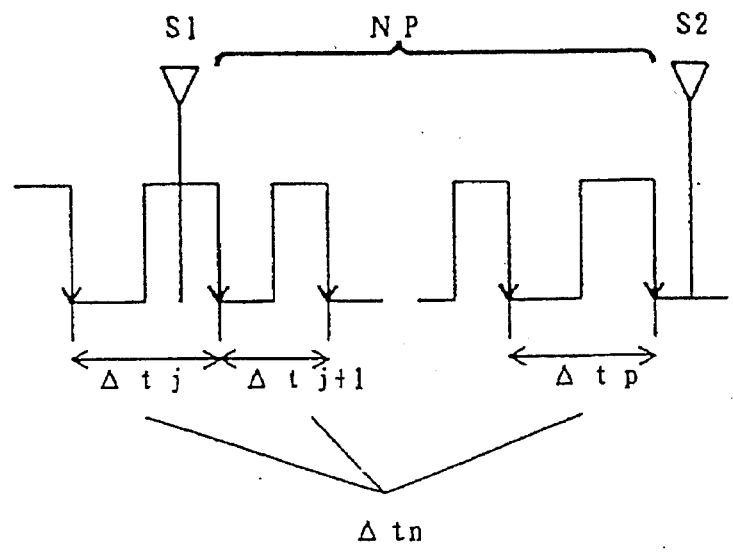
FIG. 3 is a diagram showing the state of inputted pulse signals indicative of speed data of a rotating body.
Figure 5:
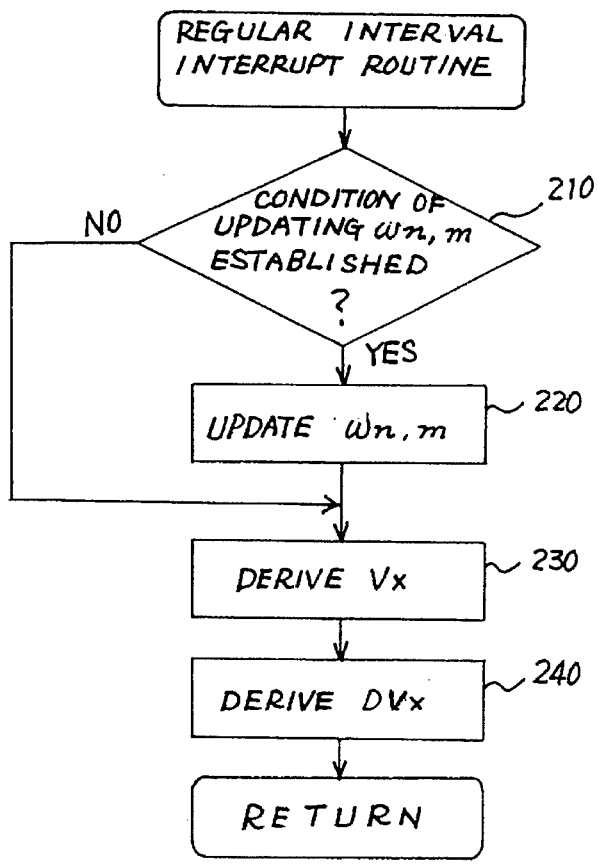
FIG. 5 is a flowchart showing a regular interval interrupt routine according to the first preferred embodiment.

FIG. 2 shows a flowchart of a pulse interrupt routine which is executed by the microcomputer 142 in response to a trailing edge of each pulse signal from the waveform shaping circuit 141. In this preferred embodiment, one pulse signal is defined between two adjacent trailing edges and corresponds to one signal period. FIG. 3 shows the state of the pulse signals inputted into the microcomputer 142 from the waveform shaping circuit 141. In FIG. 3, S1, S2 ··· represent time points, respectively, when a regular interval interrupt routine of FIG. 5 is executed. Hereinafter, an interval between the two adjacent time points will be referred to as a regular interval interrupt section.

In the pulse interrupt routine of FIG. 2, a first step 110 derives a period $\Delta t_n$ (n=1~48) of the input pulse signal as shown in FIG. 3. As seen in FIG. 3, there is an aberration or a detection error in the signal period $\Delta t_n$ due to a nonstandard factor or element, such as, deformation of the rotation detecting sections of the wheel speed sensor due to a processing failure or corrosion of the teeth of the signal rotor 12, or deformation of a rotating body due to deformation of a tire during running or due to deformation of the tire caused by disuniform wear thereof. Accordingly, a subsequent step 120 corrects the signal period $\Delta t_n$ in consideration of the detection error caused by the nonstandard factor.

Figure 4:
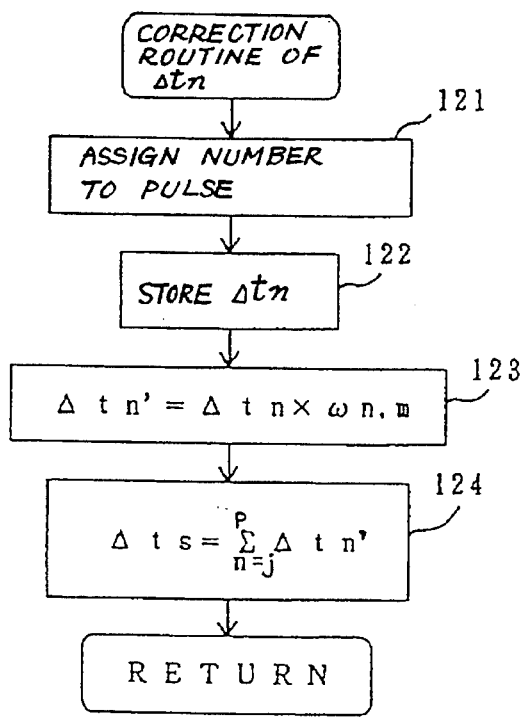
FIG. 4 is a flowchart showing a correction routine of the signal period executed at a step 120 in FIG. 2.

FIG. 4 shows a correction routine of the signal period $\Delta t_n$ executed at the step 120. A first step 121 assigns a number to a received pulse corresponding to a number of corresponding one of the teeth of the signal rotor 12. Specifically, the teeth of the signal rotor 12 are assigned beforehand numbers from 1 to a maximum value (from 1 to 48 in this preferred embodiment) as rotation detecting section numbers, and the step 121 sequentially assigns received pulses the rotation detecting section numbers 1~48 corresponding to the teeth of the signal rotor 12 through its executions corresponding to one rotation of the signal rotor 12. Subsequently, at a step 122, the newest signal period $\Delta t_n$, that is, the signal period $\Delta t_n$ derived at the step 110 in the current execution cycle of the pulse interrupt routine, is stored in a block memory in the microcomputer 142 which can store the signal periods $\Delta t_1$–$\Delta t_{48}$. Thereafter, a step 123 derives a corrected value $\Delta t_n'$ of the signal period $\Delta t_n$ based on a correction coefficient $\omega_{n,m}$ for the corresponding rotation detecting section number, i.e. the corresponding tooth of the signal rotor 12. Specifically, the corrected value $\Delta t_n'$ of the signal period $\Delta t_n$ is derived using the following equation (1):

$$\Delta t_n' = \Delta t_n \times \omega_{n,m} \quad (1)$$

wherein, n represents a rotation detecting section number, and m represents a rotation number of the rotating body.

Subsequently, a step 124 derives a sum $\Delta t_s$ of the corrected values $\Delta t_n'$ of the signal periods $\Delta t_n$ which cover from the signal period $\Delta tn$ immediately after the completion of the last execution of the regular interval interrupt routine to the newest signal period $\Delta tn$. Specifically, the sum $\Delta t_s$ is derived using the following equation (2):

$$\Delta t_s = \sum_{n=j}^{p} \Delta t_n' \quad (2)$$

wherein, j represents the first rotation detecting section number in the newest regular interval interrupt section, and p represents the final rotation detecting section number in the newest regular interval interrupt section.

As appreciated, since the rotation detecting section numbers 1~48 are repeatedly assigned to the received pulses, it is possible that j>p.

Referring now to FIG. 5, the regular interval interrupt routine will be described hereinbelow. This interrupt routine is executed by the microcomputer 142 per occurrence of a regular interval interrupt signal produced at every predetermined constant time interval.

Figure 6:
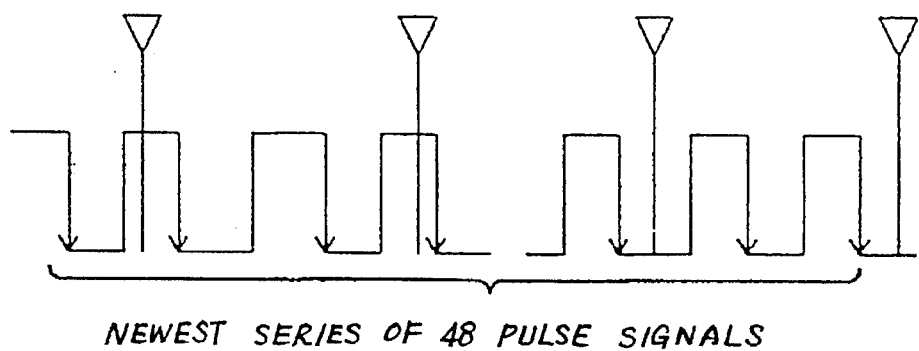
FIG. 6 is a diagram showing the state of the inputted pulse signals, which satisfies a condition of updating a correction coefficient.
Figure 7:
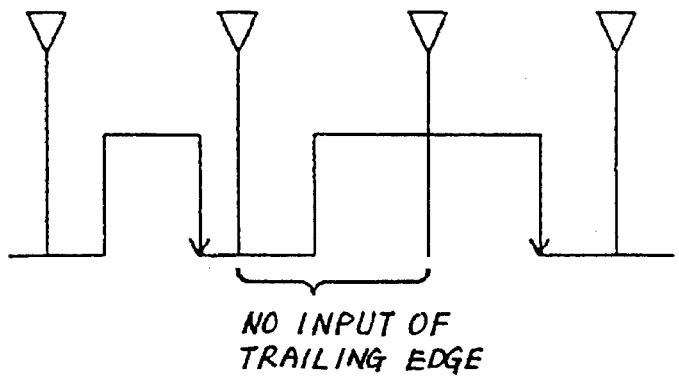
FIG. 7 is a diagram showing the state of the inputted pulse signals, which does not satisfy the condition of updating the correction coefficient.

At a first step 210, it is determined whether a condition of updating the correction coefficient $\omega_{n,m}$ is established. This condition is judged to be satisfied when the regular interval interrupt sections each include at least one trailing edge (as represented by a downward arrow in FIGS. 6 and 7) of the newest series of 48 pulse signals. For example, this condition is established in FIG. 6 since each regular interval interrupt section includes at least one trailing edge of the pulse signal. On the other hand, the condition is not established in FIG. 7 since one of the regular interval interrupt sections include no trailing edge of the pulse signal.

Subsequently, a step 220 updates the correction coefficient $\omega_{n,m}$ with respect to each of the pulses inputted in the newest regular interval interrupt section, that is, the correction coefficient $\omega_{n,m}$ is updated per rotation detecting section number, i.e. per tooth of the signal rotor 12. Thereafter, a step 230 derives a speed $V_x$ of the vehicle wheel, and a step 240 derives an acceleration $DV_x$ of the vehicle wheel.

Specifically, the step 220 updates the correction coefficient $\omega_{n,m}$ using the following equations (3), (4) and (5):

$$\omega_{n,m} = \omega_{n,m-1} + k \cdot \Delta t_h \quad (3)$$

$$\Delta t_h = \frac{S - \omega_{n,m-1} \times \Delta t_n}{S} \quad (4)$$

$$S = \sum_{n=1}^{48} \Delta t_n / 48 \quad (5)$$

wherein, m represents a rotation number of the rotating body, and k represents a correction sensitivity coefficient.

The equations (3), (4) and (5) represent that the correction coefficient $\omega_{n,m}$ is updated for the corresponding rotation detecting section number each time the corresponding tooth of the signal rotor 12 passes by the electromagnetic pickup 13. These equations further represent that a converged value of the correction coefficient $\omega_{n,m}$ is derived, which can correct, at an optional speed, the aberration or detraction error of the signal period for the corresponding rotation detecting section number caused by the nonstandard factor.

Figure 8A:
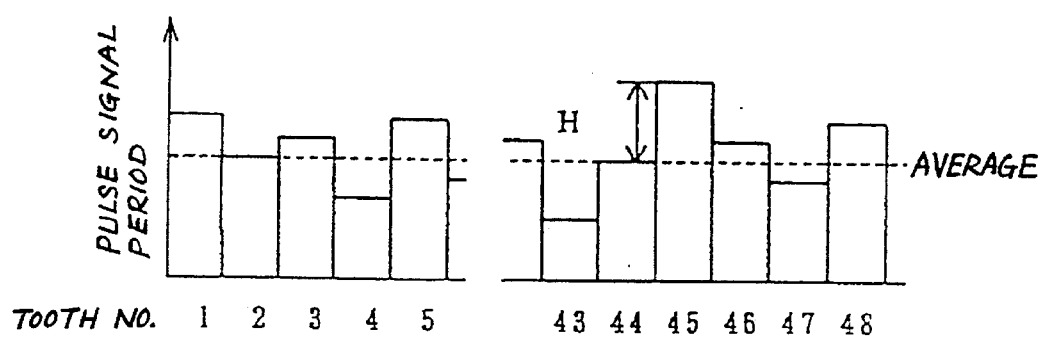
FIG. 8(A) is a diagram for explaining disuniformity of the pulse signal periods.
Figure 8B:
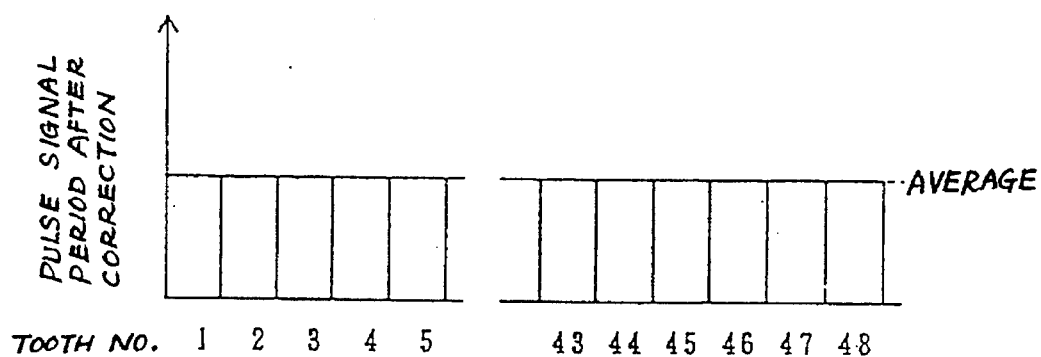
FIG. 8(B) is a diagram showing the state of the pulse signal periods after correction.

Specifically, an initial value of the correction coefficient $\omega_{n,m}$ is set to "1", and its converged value represents a rate of the signal period produced by the rotating body including the nonstandard factor, relative to the signal period produced by the rotating body including no nonstandard factor. Since a time required for one rotation of the rotating body is very short, it is assumed that a rotational speed of the rotating body is constant during one rotation thereof. On this assumption, the periods of 48 pulse signals should be constant during one rotation of the rotating body. However, in practice, due to the foregoing nonstandard factor, the signal periods become disuniform as shown in FIG. 8(A). Accordingly, the correction coefficient $\omega_{n,m}$ is updated so as to approach a deviation H between an average value of the periods of 48 pulse signals and the signal period for the corresponding rotation detecting section to zero "0", as shown in FIG. 8(B).

Figure 9:
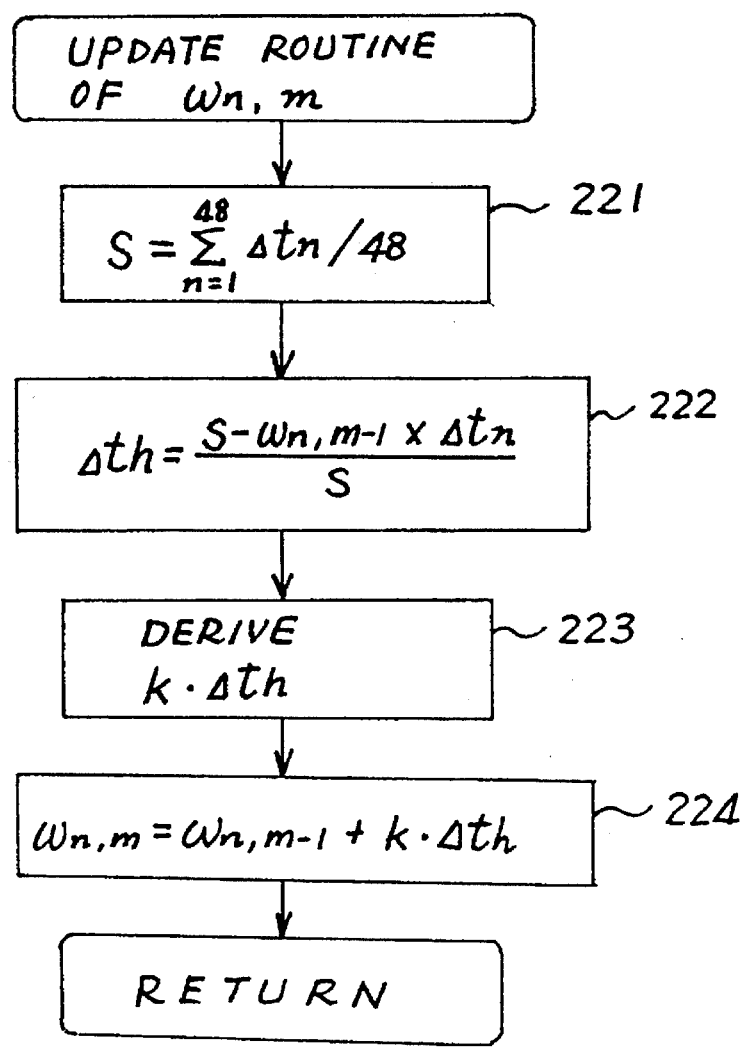
FIG. 9 is a flowchart showing an update routine of the correction coefficient executed at a step 220 in FIG. 5.

FIG. 9 shows a flowchart of an update routine of the correction coefficient $\omega_{n,m}$ as represented by the foregoing equations (3), (4) and (5). In FIG. 9, a first step 221 derives an average value S of the periods of 48 pulse signals inputted during one rotation of the rotating body. Subsequently, a step 222 derives a deviation between the average value S and the signal period $\Delta t_n$ stored at the step 122 of FIG. 4 and corrected by the last correction coefficient $\omega_{n,m-1}$, that is, $\Delta t_n'$ derived at the step 123 in FIG. 4. In order to eliminate speed dependency of the derived deviation (=S–$\omega_{n,m-1} \cdot \Delta t_n$), the step 222 further derives a rate $\Delta t_h$ of the deviation relative to the average value S ($\Delta t_h=(S-\omega_{n,m-1}\cdot \Delta t_n)/S$). This rate $\Delta t_h$ is considered to represent the aberration of the signal period for the corresponding rotation detecting section number caused by the nonstandard factor. On the other hand, when the vehicle actually travels on the road surface, the wheel speed varies at random due to vibration caused by the road surface. Accordingly, the rate $\Delta t_h$ also varies randomly at each input of the pulse signal so that it can not represent the characteristic of the rotating body at the corresponding tooth of the signal rotor, that is, the aberration of the signal period for the corresponding rotation detecting section number.

Accordingly, at a step 223, the rate $\Delta t_h$ is multiplied by the correction sensitivity coefficient k which works to adjust a converging speed of the correction coefficient $\omega_{n,m}$, so as to adjust a degree of influence of the rate $\Delta t_h$ to the correction coefficient $\omega_{n,m}$ for one input of the pulse signal. For example, when the correction sensitivity coefficient k is set smaller, the converging speed of the correction coefficient $\omega_{n,m}$ becomes lower, while variations of the correction coefficient $\omega_{n,m}$ due to random speed variations caused by the road surface vibration can be reduced. Accordingly, the influence of the random variations of the wheel speed caused by the road surface vibration to the correction coefficient $\omega_{n,m}$, which can not be otherwise avoided when the wheel speed is measured by the wheel speed sensor, can be significantly reduced.

At a subsequent step 224, the value $k\cdot \Delta t_h$ derived at the step 223 is added to the last correction coefficient $\omega_{n,m-1}$ for the corresponding rotation detecting section number so as to update the correction coefficient $\omega_{n,m}(=\omega_{n,m-1}+k\cdot\Delta t_h)$.

Figure 10A:
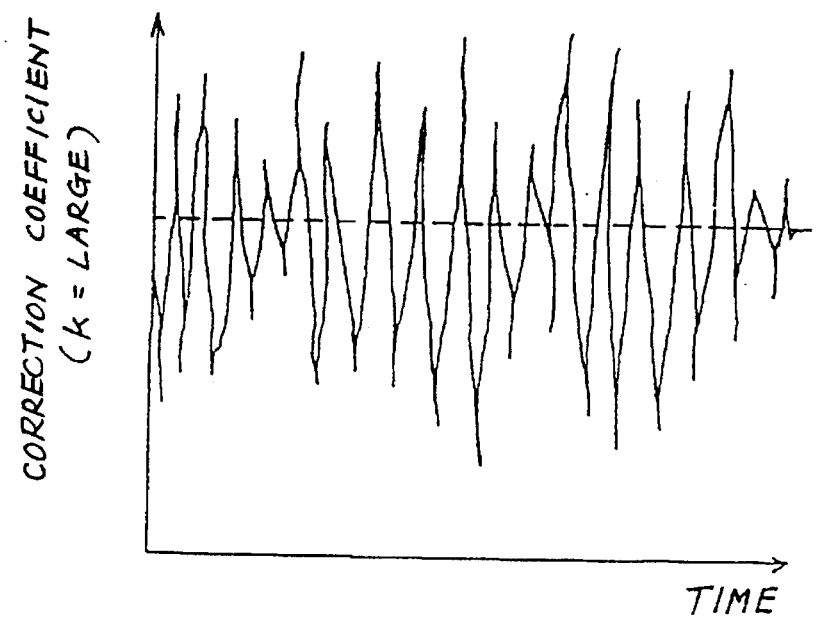
FIG. 10(A) is a diagram showing a time-domain variation of the correction coefficient, wherein a correction sensitivity coefficient is large.
Figure 10B:
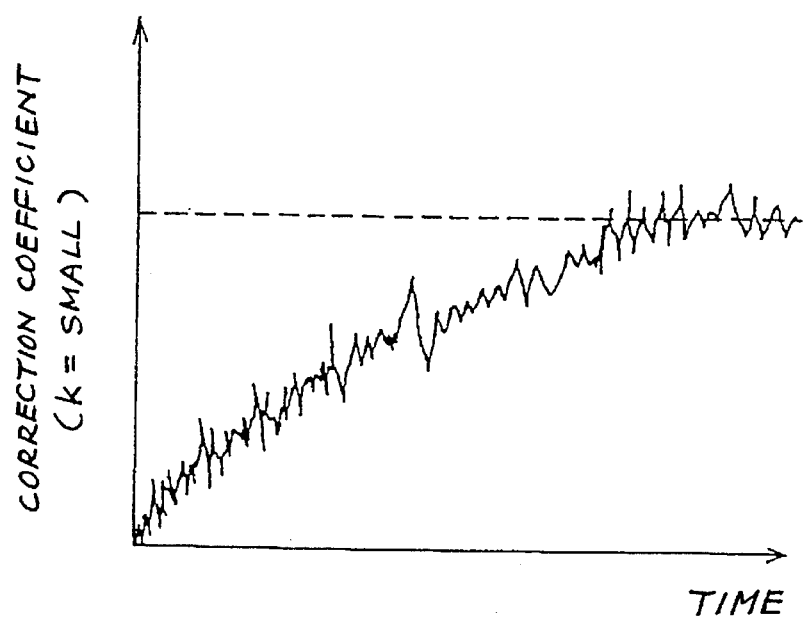
FIG. 10(B) is a diagram showing a time-domain variation of the correction coefficient, wherein the correction sensitivity coefficient is small.

FIGS. 10(A) and 10(B) respectively show time-domain variations of the correction coefficient $\omega_{n,m}$, wherein the correction sensitivity coefficient k is large in FIG. 10(A) and small in FIG. 10(B). As seen from these figures, when the correction sensitivity coefficient k is large, the converging speed of the correction coefficient $\omega_{n,m}$ is large, while the correction coefficient $\omega_{n,m}$ is liable to be affected by the road surface vibration so that its variations are large. On the other hand, when the correction sensitivity coefficient k is small, the converging speed of the correction coefficient $\omega_{n,m}$ is low, while the correction coefficient $\omega_{n,m}$ is not liable to be affected by the road surface vibration so that its variations are small. According to the experiments performed by the present inventors, when the vehicle wheel is rotated at substantially a constant speed with k=0.008, the correction coefficient $\omega_{n,m}$ converges to substantially a constant value when the tire makes about 500 rotations (about 35 seconds at 100 km/h; about 70 seconds at 50 km/h).

Figure 11:
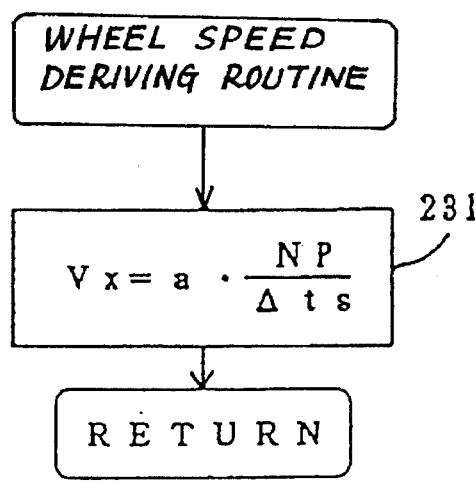
FIG. 11 is a flowchart of a wheel speed deriving routine executed at a step 230 in FIG. 5.

FIG. 11 shows a flowchart of a wheel speed deriving routine executed at the step 230 in FIG. 5. In FIG. 11, a step 231 derives the wheel speed $V_x$. The wheel speed $V_x$ is derived based on the sum $\Delta t_s$ of the corrected signal periods $\Delta t_n'$ in the newest regular interval interrupt section as represented by the foregoing equation (2), the number $N_P$ of the input pulse signals during $\Delta t_s$ as shown in FIG. 3, and a speed constant a which is determined by the number (48) of the teeth of the signal rotor 12 and a radius of the vehicle wheel. Specifically, the wheel speed $V_x$ is derived using the following equation (6):

$$V_x = a\cdot(N_P/\Delta t_s) \qquad (6)$$

Figure 12:
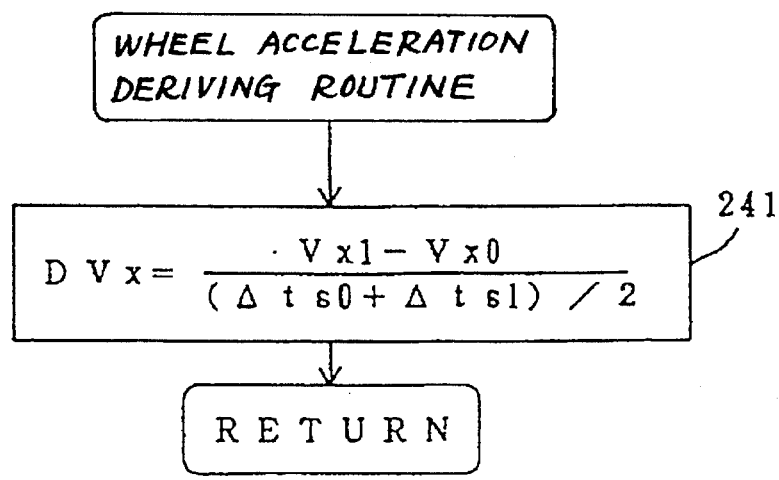
FIG. 12 is a flowchart of a wheel acceleration deriving routine executed at a step 240 in FIG. 5.

FIG. 12 shows a flowchart of a wheel acceleration deriving routine executed at the step 240 in FIG. 5. In FIG. 12, a step 241 derives the wheel acceleration $DV_x$ (D represents a time differential). The wheel acceleration $DV_x$ is derived based on the last wheel speed $V_{x0}$ derived in the last execution cycle of the regular interval interrupt routine, the newest wheel speed $V_{x1}$ derived in the current execution cycle of the regular interval interrupt routine, the sum $\Delta t_{s0}$ of the corrected signal periods in the last regular interval interrupt section and the sum $\Delta t_{s1}$ of the corrected signal periods in the newest regular interval interrupt section. Specifically, the wheel acceleration $DV_x$ is derived using the following equation (7):

$$DV_x=(V_{x1}-V_{x0})/((\Delta t_{s0}+\Delta t_{s1})/2) \qquad (7)$$

Now, a second preferred embodiment of the present invention will be described hereinbelow. In the second preferred embodiment, running conditions, such as, roughness of the road surface and the vehicle acceleration/deceleration condition are detected so as to adjust a degree of the updating of the correction coefficient $\omega_{n,m}$ based on the detected running condition. This is effective to prevent the erroneous correction of the signal period which is otherwise caused due to the roughness of the road surface and the vehicle acceleration/deceleration condition.

Figure 13:
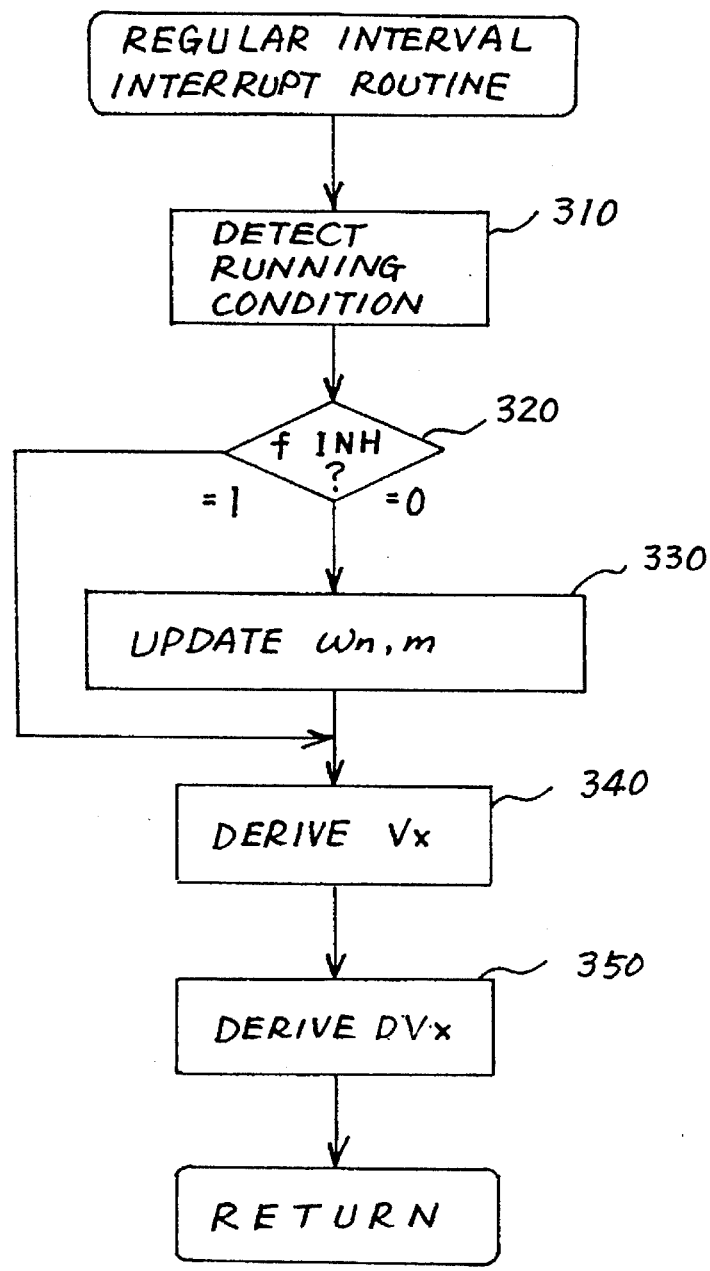
FIG. 13 is a flowchart of a regular interval interrupt routine according to a second preferred embodiment of the present invention.

FIG. 13 shows a flowchart of a regular interval interrupt routine according to this preferred embodiment. Since the pulse interrupt routine is the same as that in the first preferred embodiment, no further detailed explanation will be made hereinbelow.

In FIG. 13, at a first step 310, a running condition which induces an error in correcting a pulse interval, that is, the signal period, is detected in this preferred embodiment, the step 310 detects the vehicle acceleration/deceleration condition and the roughness of the road surface.

Subsequently, a step 320 determines whether the running condition detected by the step 310 is suitable for updating the correction coefficient $\omega_{n,m}$. If the step 320 determines as suitable, the routine proceeds to a step 330 where the correction coefficient $\omega_{n,m}$ is updated. On the other hand, if the step 320 determines as unsuitable, the routine proceeds to a step 340 and then to a step 350, where the wheel speed $V_x$ and the wheel acceleration $DV_x$ are derived as at the steps 230 and 240 in FIG. 5.

The step 330 corresponds to the step 220 in FIG. 5. At the step 330, the foregoing equations (3), (4) and (5) are used for updating the correction coefficient $\omega_{n,m}$. However, in this preferred embodiment, the correction sensitivity coefficient k is selectable or switchable depending on the running condition detected at the step 310 so as to allow the steps 340 and 350 to derive the wheel speed $V_x$ and the wheel acceleration $DV_x$ without being affected by the vehicle acceleration/deceleration condition and the roughness of the road surface.

Hereinbelow, the steps in FIG. 13 will be described in more detail.

Figure 14:
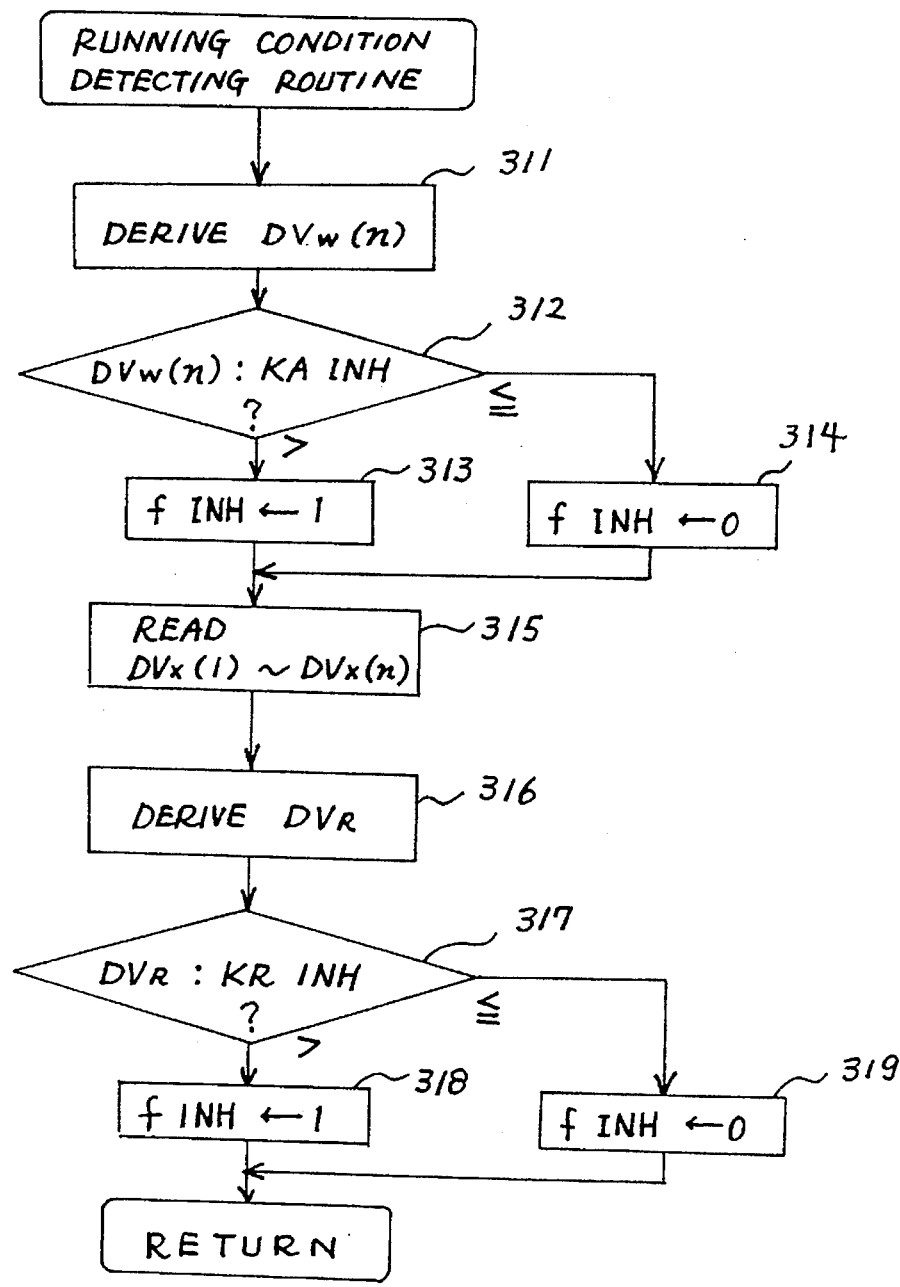
FIG. 14 is a flowchart of a running condition detecting routine executed at a step 310 in FIG. 13.

FIG. 14 shows a flowchart of a running condition detecting routine executed at the step 310. In FIG. 14, steps 311 to 314 determine the vehicle acceleration/deceleration condition in the following manner:

At the step 311, the wheel acceleration $DV_x$ derived in the last execution cycle of the regular interval interrupt routine is filtered for eliminating high-frequency components indicative of vibrations caused by the road surface and the driving system of the vehicle so as to extract an acceleration/deceleration component $DV_w$ at a relatively low frequency. This filter can be realized in the form represented by, such as, the following equation (8):

$$DV_w(n) = Ka0 \times DV_x(n) + Ka1 \times DV_x(n-1) + \qquad (8)$$
$$Ka2 \times DV_x(n-2) + Kb1 \times DV_w(n-1) +$$
$$Kb2 \times DV_w(n-2)$$

wherein, Ka0~Kb2 represent constants, respectively, which are determined by frequencies to be eliminated, and (n), (n–1) and (n–2) represent the newest, last and before-last execution cycles of the regular interval interrupt routine, respectively.

Subsequently, the step 312 compares the wheel acceleration $DV_w$ with a given value $KA_{INH}$. If $DV_w(n) > KA_{INH}$, the routine proceeds to the step 313 where a flag $f_{INH}$ is set to "1" so as to prohibit updating the correction coefficient, and then to a step 315. On the other hand, if $DV_w(n) \leq KA_{INH}$, the routine proceeds to the step 314 where the flag $f_{INH}$ is reset to "0", and then to the step 315.

Although the step 311 utilizes the instantaneous wheel acceleration derived in the last execution cycle of the regular interval interrupt routine as the vehicle acceleration/deceleration condition, acceleration data may be extracted from speed data corresponding to one rotation cycle of the signal rotor 12, using the following equation (9), so as to be used as the vehicle acceleration/deceleration condition:

$$DV_w(n) = |V_x(n) - V_x(l)| \qquad (9)$$

wherein, $V_x$ (n) represents a wheel speed derived in the last execution cycle of the regular interval interrupt routine, and $V_x$ (l) represents a wheel speed derived in the regular interval interrupt routine which was executed around a time going back by one rotation cycle of the signal rotor 12. By utilizing the acceleration data $DV_w$ thus derived as the acceleration/deceleration condition, it is possible to judge more precisely the influence of the acceleration/deceleration condition to an average pulse interval of one rotation cycle of the signal rotor 12.

Subsequently, steps 315 to 319 determine the roughness of the road surface in the following manner:

The step 315 reads out the stored wheel accelerations $DV_x$ (l) to $DV_x$ (n) corresponding to the last one rotation cycle of the signal rotor 12 going back from the last execution cycle of the regular interval interrupt routine. Subsequently, the step 316 derives a maximum value $DV_{MAX}$ and a minimum value $DV_{MIN}$ among $DV_x$ (l) to $DV_x$ (n). The step 316 further derives a roughness degree evaluation value $DV_R$ of the road surface, using the following equation (10):

$$DV_R = |DV_{MAX} - DV_{MIN}| \qquad (10)$$

Thereafter, the step 317 compares the evaluation value $DV_R$ with a given value $KR_{INH}$. If $DV_R > KR_{INH}$, the routine proceeds to the step 318 where the flag $f_{INH}$ is set to "1" so as to prohibit updating the correction coefficient. On the other hand, if $DV_R \leq KR_{INH}$, the routine proceeds to the step 319 where the flag $f_{INH}$ is reset to "0". From either one of the steps 318 and 319, the routine proceeds to the step 320 in FIG. 13.

The step 320 determines whether the flag $f_{INH}$ is set or not. If it is set, the routine proceeds to the step 340 bypassing the step 330. On the other hand, if it is reset, the routine proceeds to the step 330 where the correction coefficient $\omega_{n,m}$ is updated.

Figure 15:
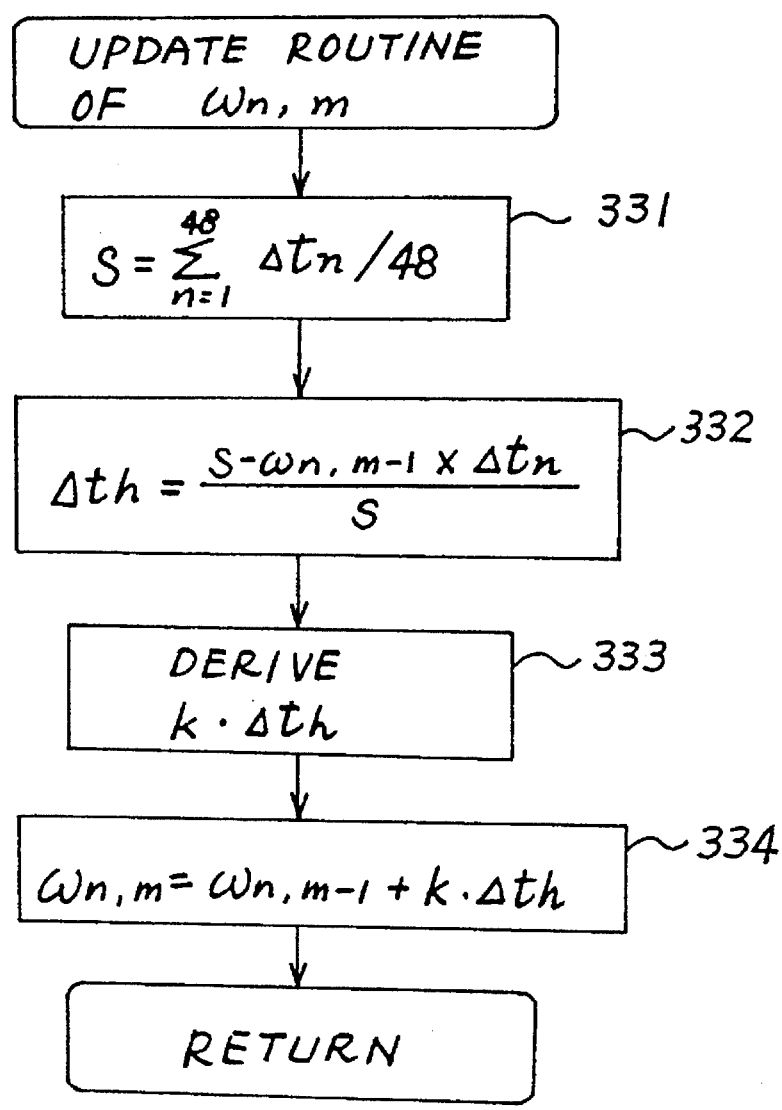
FIG. 15 is a flowchart showing an update routine of the correction coefficient executed at a step 330 in FIG. 13.

FIG. 15 shows a flowchart of a correction coefficient update routine executed at the step 330 in FIG. 13. Since the correction coefficient update routine of FIG. 15 differs from that of FIG. 9 only in setting the correction sensitivity coefficient k, the following description will mainly refer to how to determine the correction sensitivity coefficient k.

In this preferred embodiment, the correction sensitivity coefficient k is switched depending on the running condition, that is, the acceleration/deceleration condition and the road surface condition derived at the step 310 in FIG. 13, which will be described hereinbelow with reference to FIGS. 16 and 17.

Figure 16:
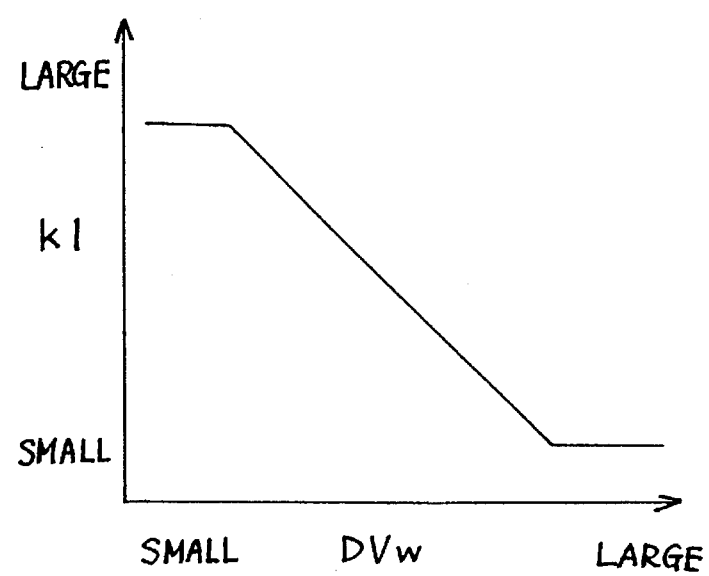
FIG. 16 is a map for determining a correction sensitivity coefficient element based on an acceleration/deceleration condition derived in a current execution cycle of the regular interval interrupt routine.
Figure 17:
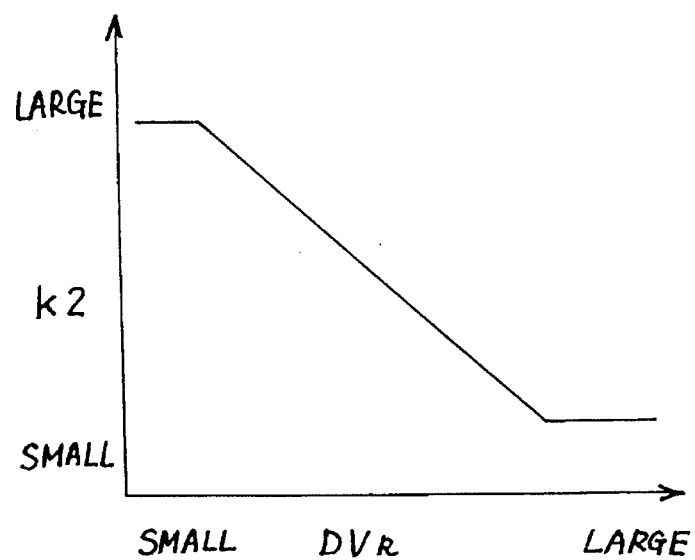
FIG. 17 is a map for determining a correction sensitivity coefficient element based on a road surface roughness evaluation value derived in the current execution cycle of the regular interval interrupt routine.

FIG. 16 shows a map for determining a correction sensitivity coefficient element k1 based on the acceleration/deceleration condition $DV_w$ derived at the step 311 in the current execution cycle of the regular interval interrupt routine. Similarly, FIG. 17 shows a map for determining a correction sensitivity coefficient element k2 based on the road surface roughness evaluation value $DV_R$ derived at the step 310 in the current execution cycle of the regular interval interrupt routine. These maps are prestored in a ROM incorporated in the ECU 14. The correction sensitivity coefficient k is derived based on the correction sensitivity coefficient elements k1 and k2 determined by the maps, using the following equation (11):

$$k = K_{H1} \times k1 + K_{H2} \times k2 \qquad (11)$$

wherein, $K_{H1}$ and $K_{H2}$ represent predetermined weighting coefficients, respectively.

Since an updating value of the correction coefficient $\omega_{n,m}$ is corrected using the correction sensitivity coefficient k thus derived, the error in correcting the pulse interval caused by the rapid acceleration/deceleration and the rough road surface is effectively prevented so that the aberration of the pulse interval caused by the nonstandard factor existing at the rotation detecting sections of the speed sensor 12, 13 can be precisely corrected.

In this preferred embodiment, the correction coefficient is not updated when the running condition indicative value is greater than the given value. On the other hand, it may be arranged to delete the step 320 in FIG. 13 and to set the correction sensitivity coefficient to be small when the running condition indicative value is greater than the given value, so that the correction coefficient can be updated irrespective of the running condition.

Further, it may be arranged to update the correction coefficient using a given fixed correction sensitivity coefficient when the step 320 determines to update the correction coefficient. This arrangement is simpler, but is still capable of prohibiting updating the correction coefficient when the running condition is not preferable.

Referring back to the first preferred embodiment, the correction value ($k \cdot \Delta t_h$) derived at the step 223 in FIG. 9 may be compared with a preset value representing a maximum correction value for one update process. When the correction value is greater than the preset value, the correction coefficient is updated using the preset value instead of the derived correction value so that the correction error caused by the road surface condition and the acceleration/deceleration condition can be suppressed without determining the running condition.

Now, a third preferred embodiment of the present invention will be described hereinbelow.

In the third preferred embodiment, by monitoring a time-domain variation of the correction coefficient, it is detected whether the correction coefficient has been converged to a value which corresponds to the aberration of the pulse interval due to the nonstandard factor of the corresponding rotation detecting section of the speed sensor. Accordingly, by storing this converged value and using it thereafter for the corresponding rotation detecting section, the wheel speed and the wheel acceleration can be precisely and continuously derived.

Figure 18:
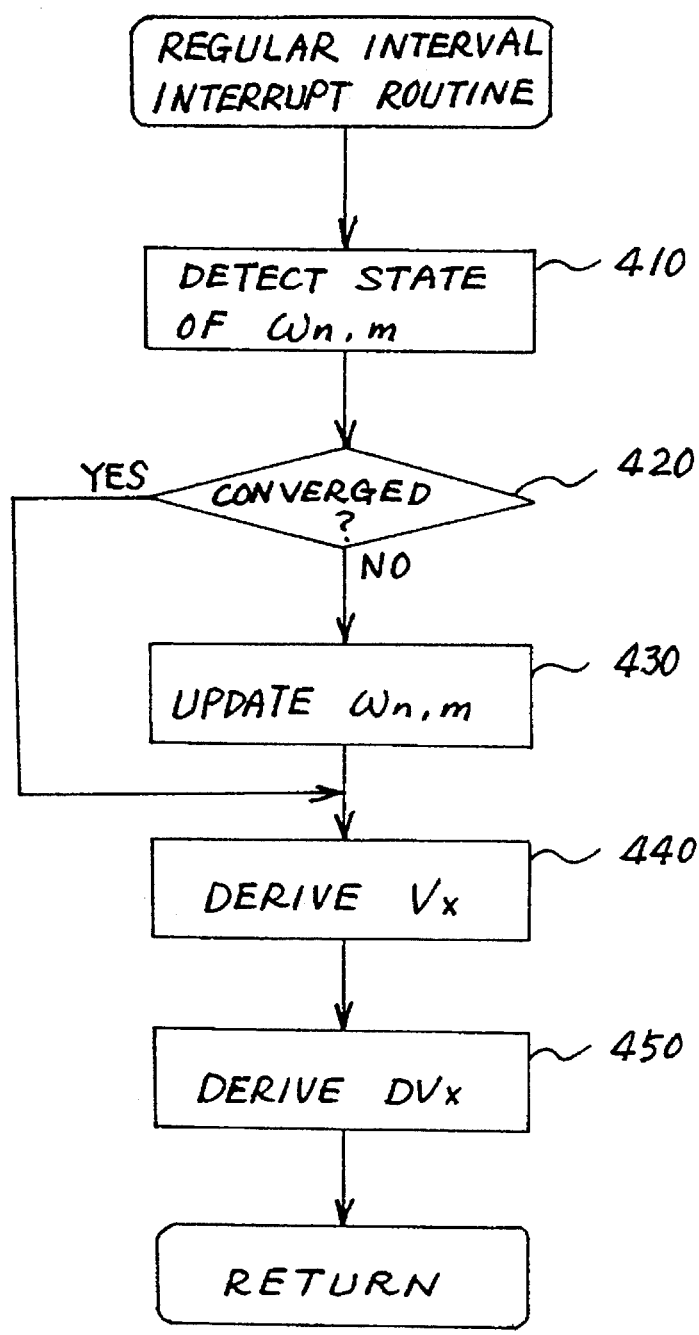
FIG. 18 is a flowchart showing a regular interval interrupt routine according to a third preferred embodiment of the present invention.

FIG. 18 shows a flowchart of a regular interval interrupt routine according to the third preferred embodiment. The processes not referred to in the following description are substantially the same as those in the first preferred embodiment. Accordingly, no further detailed description will be provided for those processes.

In FIG. 18, a first step 410 detects a state of the correction coefficient. Subsequently, a step 420 determines whether the correction coefficient has been converged, that is, whether the convergence of the correction coefficient has been completed. If completed, the routine proceeds, bypassing a step 430 where the correction coefficient is updated, to steps 440 and 450 where the wheel speed $V_x$ and the wheel acceleration $DV_x$ are derived, respectively.

Figure 19:
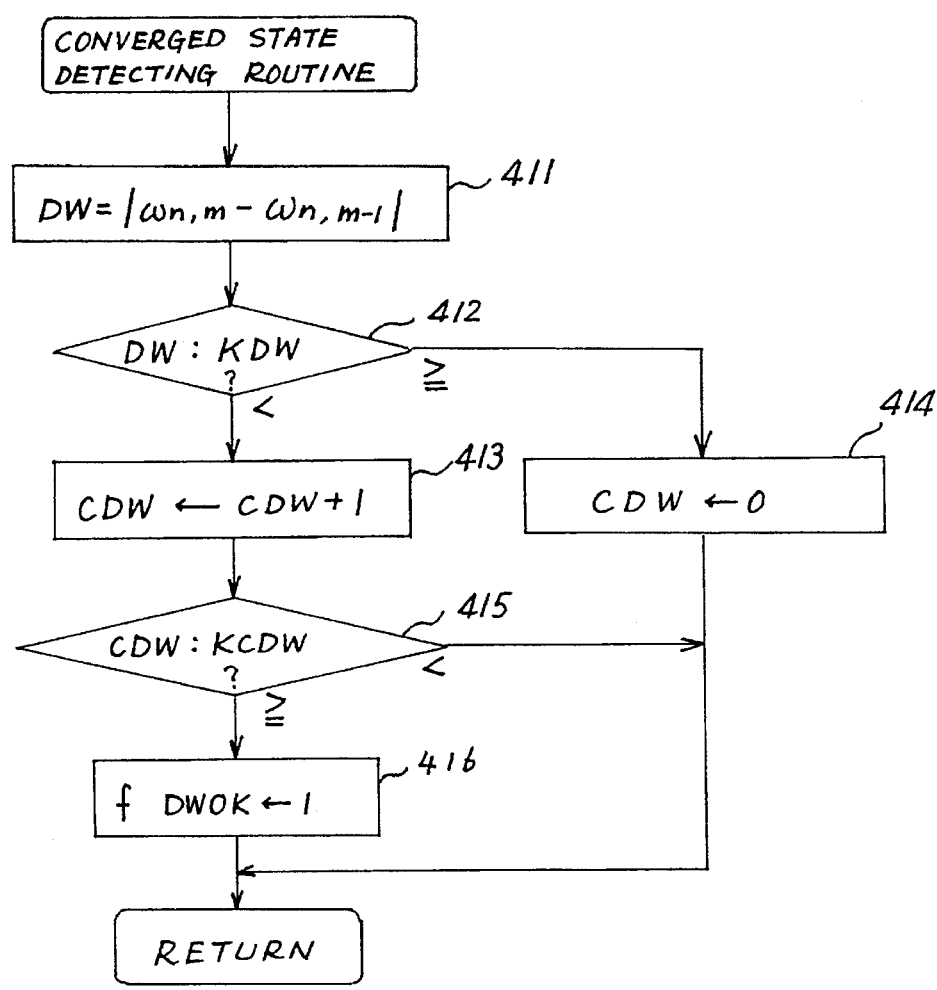
FIG. 19 is a flowchart showing a converged state detecting routine executed at a step 410 in FIG. 18.

FIG. 19 shows a flowchart of a converging state detecting routine executed at the step 410 in FIG. 18. In FIG. 19, a first step 411 derives a time-domain variation DW indicative of a difference between the last correction coefficient $\omega_{n,m-1}$ and the current correction coefficient $\omega_{n,m}$ corresponding to the first pulse in the newest regular interval interrupt section.

Subsequently, a step 412 compares the variation DW with a given value KDW. If DW≧KDW, the routine proceeds to a step 414 as determining that the correction coefficient is varying. The step 414 clears a counter CDW. On the other hand, if DW<KDW, the routine proceeds to a step 413 where the counter CDW is incremented by "1".

Thereafter, a step 415 compares a value of the counter CDW with a given value KCDW. If CDW<KCDW, the routine proceeds to the step 420. On the other hand, if CDW≧KCDW, that is, if a condition of the variations DW being smaller than the given value KDW has continued for the given time KCDW, the routine proceeds to a step 416 where a flag $f_{DWOK}$ is set to "1", meaning that the convergence of the correction coefficient is completed. As appreciated, the variation DW is derived for the first pulse in each of the regular interval interrupt sections. When the flag $f_{DWOK}$ is set at the step 416, the step 420 produces a positive answer so that the wheel speed and the wheel acceleration are derived at the steps 440 and 450, respectively, without updating the correction coefficient. In this case, all the correction coefficients $\omega_{n,m}$ for the corresponding pulses within the newest regular interval section are considered to be converged values and stored as fixed correction coefficients for the corresponding pulses, i.e. for the corresponding teeth of the signal rotor 12 of the speed sensor.

In general, during running on the rough road surface or under the acceleration/deceleration condition of the vehicle, which causes the correction error of the correction coefficient, the correction coefficients sequentially derived in the regular interval interrupt routine vary at random. Accordingly, when a time-domain variation of the correction coefficient is held smaller than the given value for the given time period, it can be determined that the correction coefficients for the pulses within the newest regular interval section have been converged to the respective values which correspond to the aberrations of the corresponding pulse intervals caused by the nonstandard factor at the rotation detecting sections of the speed sensor. Thus, by using the stored converged correction coefficients, the pulse intervals or the signal periods are precisely corrected without being affected by the foregoing disturbance factors, i.e. the rough road surface and the acceleration/deceleration condition.

In this preferred embodiment, the time-domain variation DW of the correction coefficient is derived for the first pulse in each regular interval interrupt section. However, the last pulse or one of the other pulses in each regular interval interrupt section may be derived for determining the converged state of the correction coefficient.

Further, in this preferred embodiment, the time-domain variation DW of the correction coefficient is derived only for one of the pulses in each regular interval interrupt section. However, it may be arranged that the time-domain variations of the correction coefficients for all the pulses in each regular interval interrupt section are derived and that the flag $f_{DWOK}$ is set to "1" only when all the derived variations are less than the given value, and in addition, the counter value CDW becomes equal to or greater than a given value.

Further, in this preferred embodiment, the converged state of the correction coefficient ω is detected. However, in consideration of the fact that the influence of the road surface condition and the acceleration/deceleration condition are generated at random, it may be possible to exclude the foregoing influence by performing a filtering process. Specifically, such a filtering process is realized by adding first and second steps after the step 220 in FIG. 5 in the first preferred embodiment. The first step stores the correction coefficients ω updated at the step 220, and the second step filters each of the correction coefficients ω stored at the first step using the following equation (12):

$$\omega_w(n,m) = Kc0 \times \omega(n,m) + Kc1 \times \omega(n,m-1) + \quad (12)$$
$$Kc2 \times \omega(n,m-2) + Kd1 \times \omega_w(n,m-1) +$$
$$Kd2 \times \omega_w(n,m-2)$$

wherein, Kc0~Kd2 represent constants, respectively, which are determined by frequencies to be eliminated, n represents a rotation detecting section number, and m represents a rotation number of the rotating body.

On the other hand, the filtering process may be performed by simply using a moving average of the correction coefficients $\omega_n$.

By means of the foregoing filtering process, the wheel speed and the wheel acceleration can be precisely derived even when the road surface condition and the acceleration/deceleration condition otherwise adversely affect the correction of the signal period.

Now, a fourth preferred embodiment of the present invention will be described hereinbelow. In this preferred embodiment, when the assignment of the number to a pulse fails at the step 121 in FIG. 4, that is, the positional data of the corresponding rotation detecting section is lost, due to a signal level of the speed sensor lowered to such an extent where the corresponding pulse can not be detected, it can be prevented that the correction coefficient is applied to the wrong rotation detecting section. The lowering of the sensor signal level is caused by, such as, a reduction of the rotation speed of the rotating body including the signal rotor 12.

Figure 20:
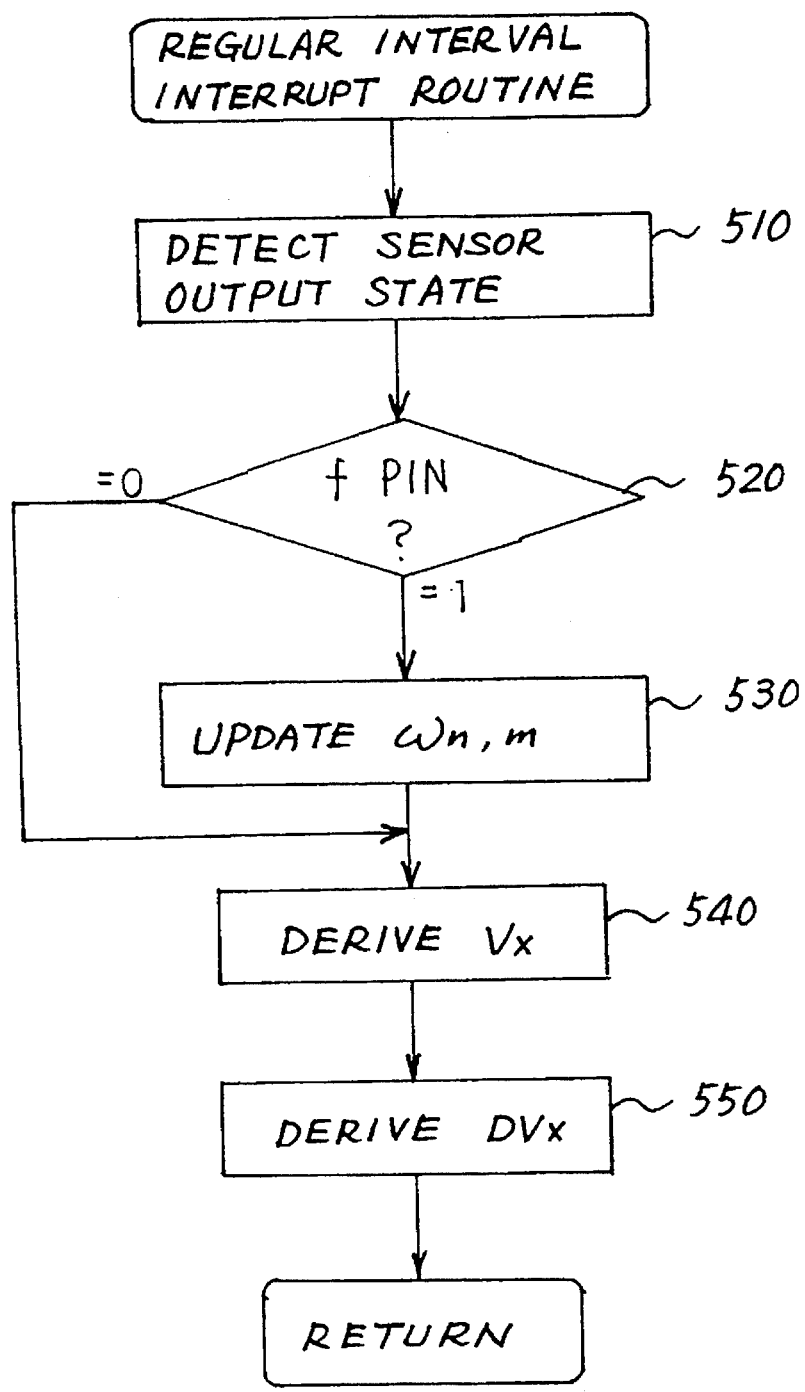
FIG. 20 is a flowchart showing a regular interval interrupt routine according to a fourth preferred embodiment of the present invention.

FIG. 20 shows a flowchart of a regular interval interrupt routine according to the fourth preferred embodiment. The processes not referred to in the following description are substantially the same as those in the first preferred embodiment. Accordingly, no further detailed description will be provided for those processes.

In FIG. 20, a first step 510 detects an output state of the speed sensor 12, 13. Subsequently, a step 520 determines whether to update the correction coefficient $\omega_{n,m}$, based on the detected sensor output state. When the step 520 determines to update the correction coefficient, a step 530 adjusts the correction sensitivity coefficient k to be used in updating the correction coefficient, based on the detected sensor output state.

Figure 21:
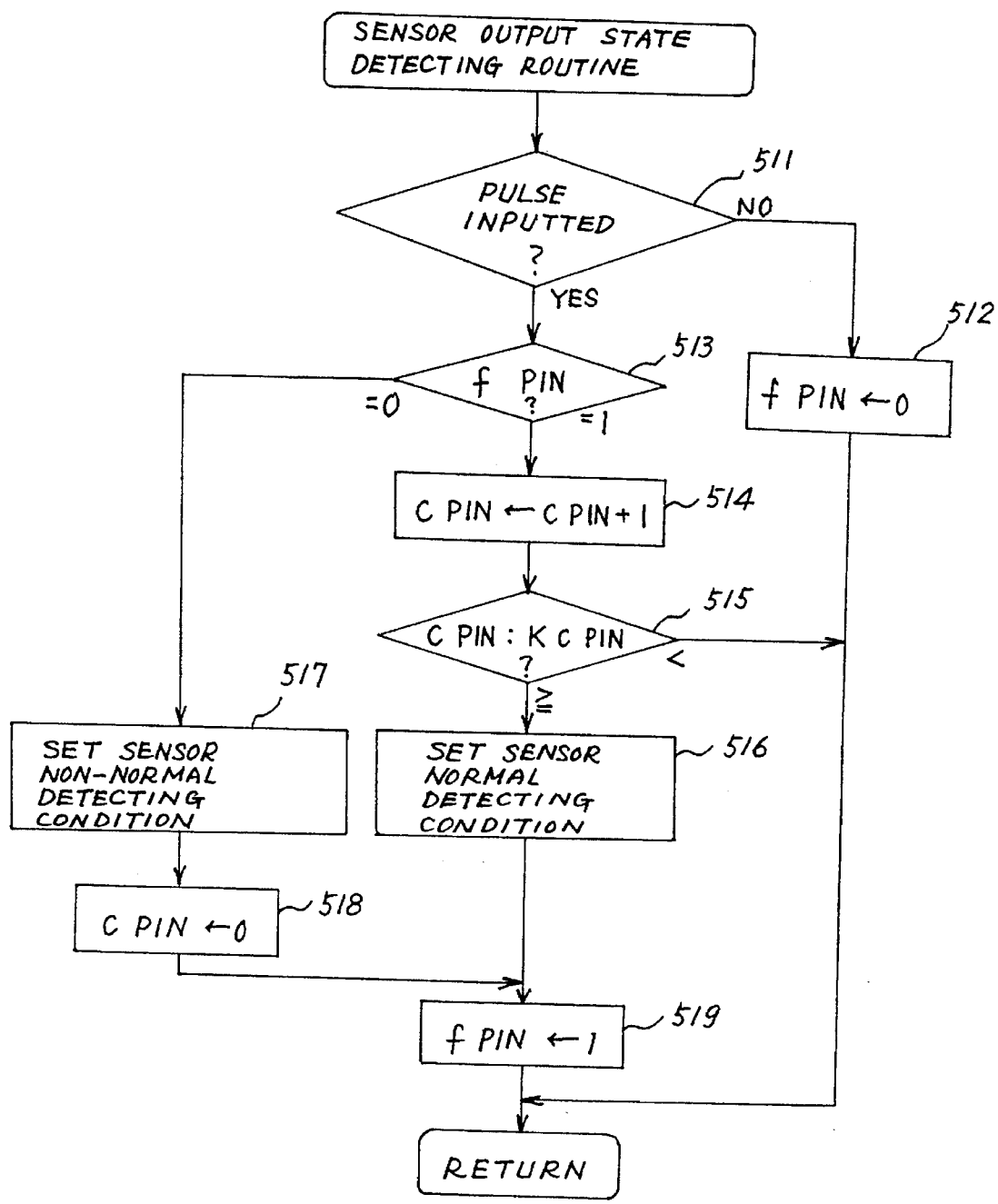
FIG. 21 is a flowchart showing a sensor output state detecting routine executed at a step 510 in FIG. 20.

FIG. 21 shows a flowchart of a sensor output state detecting routine executed at the step 510 in FIG. 20. In FIG.

21, a first step 511 determines whether a pulse input exists between the last and current execution cycles of the regular interval interrupt routine. If positive, the routine proceeds to a step 513. On the other hand, if negative, the routine proceeds to a step 512 where a flag $f_{PIN}$ is reset to "0", and then to the step 520 in FIG. 20.

At the step 513, it is checked whether the flag $f_{PIN}$ is set or reset, that is, whether the flag $f_{PIN}$ was set or reset in the last cycle of the regular interval interrupt routine. If the flag $f_{PIN}$ is set, the routine proceeds to a step 5 14 where a counter $C_{PIN}$ is incremented by "1". The value of the counter $C_{PIN}$ indicates how many times the positive answer at the step 511 is continuously produced. Subsequently, a step 515 compares the counter value $C_{PIN}$ with a given value $KC_{PIN}$. If $C_{PIN} \geq KC_{PIN}$, the routine proceeds to a step 516 where a sensor normal detecting condition is set, and then to a step 519. On the other hand, if $C_{PIN} < KC_{PIN}$, the routine proceeds to the step 520 in FIG. 20.

Referring back to the step 513, if the flag $f_{PIN}$ is reset, since no pulse input exists in the last execution cycle while the pulse input exists in the current execution cycle, it can be decided that the rotation speed of the rotating body increases from the low-speed range. In this situation, a possibility is high that a low-level pulse/pulses which can not be detected may exist between the last pulse in the previous execution cycle and the first pulse in the current execution cycle. Accordingly, it is necessary to re-calculate the correction coefficients for the first pulse in the current execution and subsequent pulses. In order for this, the routine proceeds to a step 517 where the correction coefficients for the last one rotation cycle of the signal rotor 12, including the correction coefficients in the newest regular interval interrupt section, are initialized to "1", and a sensor non-normal detecting condition is set. Then, the routine proceeds to a step 518 where the counter $C_{PIN}$ is reset, and further to the step 519.

At the step 5 19, the flag $f_{PIN}$ is set. Thereafter, the routine proceeds to the step 520 in FIG. 20. The step 520 determines whether to update the correction coefficient, based on the condition of the flag $f_{PIN}$. Specifically, the step 520 allows the routine to proceed to a step 540 bypassing the step 530 when the flag $f_{PIN}$ Is reset. In this case, since no pulse input exists in the newest regular interval interrupt section, the wheel speed $V_x$ is not derived at the step 540, and thus, the wheel acceleration $DV_x$ is not derived at the step 550, either.

On the other hand, the step 520 allows the routine to proceed to the step 530 when the flag $f_{PIN}$ is set. In this case, when the sensor non-normal detecting condition is set at the step 517, that is, no pulse input exists in the last regular interval interrupt section and when only one pulse is inputted in the newest regular interval interrupt section, the wheel speed $V_x$ and the wheel acceleration $DV_x$ are not derived at the steps 540 and 550.

Figure 22:
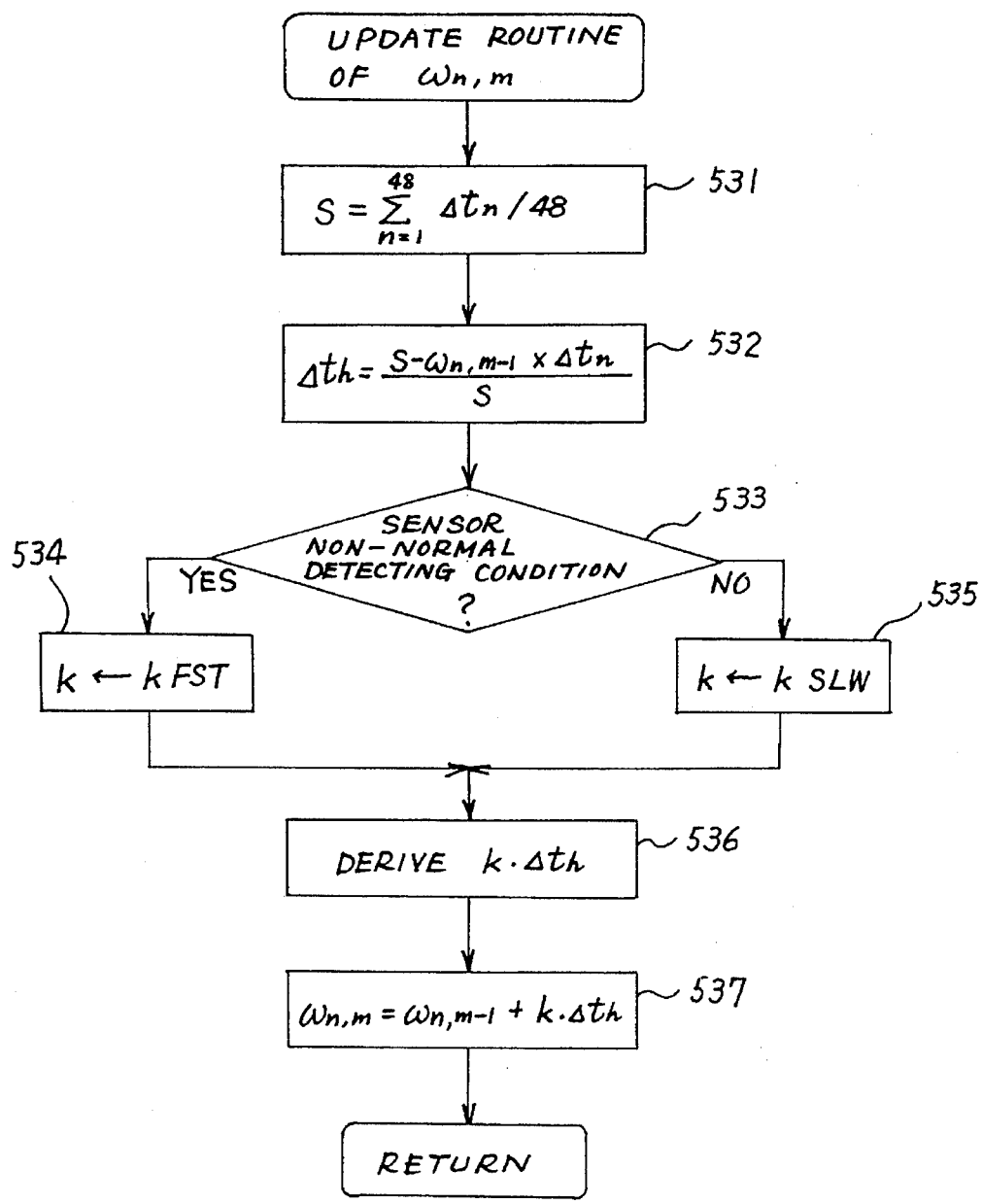
FIG. 22 is a flowchart showing an update routine of the correction coefficient executed at a step 530 in FIG. 20.

FIG. 22 shows a flowchart of a correction coefficient updating routine executed at the step 530 in FIG. 20. In this correction coefficient updating routine, the correction coefficient $\omega_{n,m}$ is derived in the same manner as in the first preferred embodiment except that the correction sensitivity coefficient k is switched depending on the sensor output state detected at the step 510 in FIG. 20.

Specifically, a step 533 determines whether the sensor detecting condition is normal or non-normal as set at the step 516 or 517. If the sensor non-normal detecting condition is determined at the step 533, the routine proceeds to a step 534 where the correction sensitivity coefficient k is set to a given relatively large correction sensitivity coefficient $k_{FST}$ which provides a higher converging speed of the correction coefficient than normal. On the other hand, if the sensor normal detecting condition is determined at the step 533, the routine proceeds to a step 535 where the correction sensitivity coefficient k is set to a normal correction sensitivity coefficient $k_{SLW}$ which is smaller than the coefficient $k_{FST}$ and thus provides a smaller converging speed of the correction coefficient.

It is to be appreciated that the correction sensitivity coefficient k set at We step 534 is held until the correction sensitivity coefficient k is set at the step 534 in a further execution cycle of the regular interval interrupt routine. Similarly, the correction coefficient k set at the step 535 is held until the correction sensitivity coefficient k is set at the step 534 in a further execution cycle of the regular interval interrupt routine.

According to the fourth preferred embodiment as structured above, the correction coefficient $\omega_{n,m}$ is updated as in the first preferred embodiment when the sensor detecting condition is determined normal. On the other hand, when the sensor output signal level is lowered so that the sensor detecting condition is determined non-normal, the sensor sensitivity coefficient k is set larger than normal for a given time period so as to increase the converging speed of the correction coefficient $\omega_{n,m}$.

Now, a fifth preferred embodiment of the present invention will be described hereinbelow.

As appreciated, in the fourth preferred embodiment, when the sensor output level is lowered so that the positional data of the corresponding rotation detecting section is lost, the correction sensitivity coefficient is adjusted so as to allow the convergence of the correction coefficient at a high speed. On the other hand, in the fifth preferred embodiment, after the loss of the positional data, the positional data is corrected based on newly derived correction coefficients so as to effectively utilize the previous correction coefficients.

Figure 23:
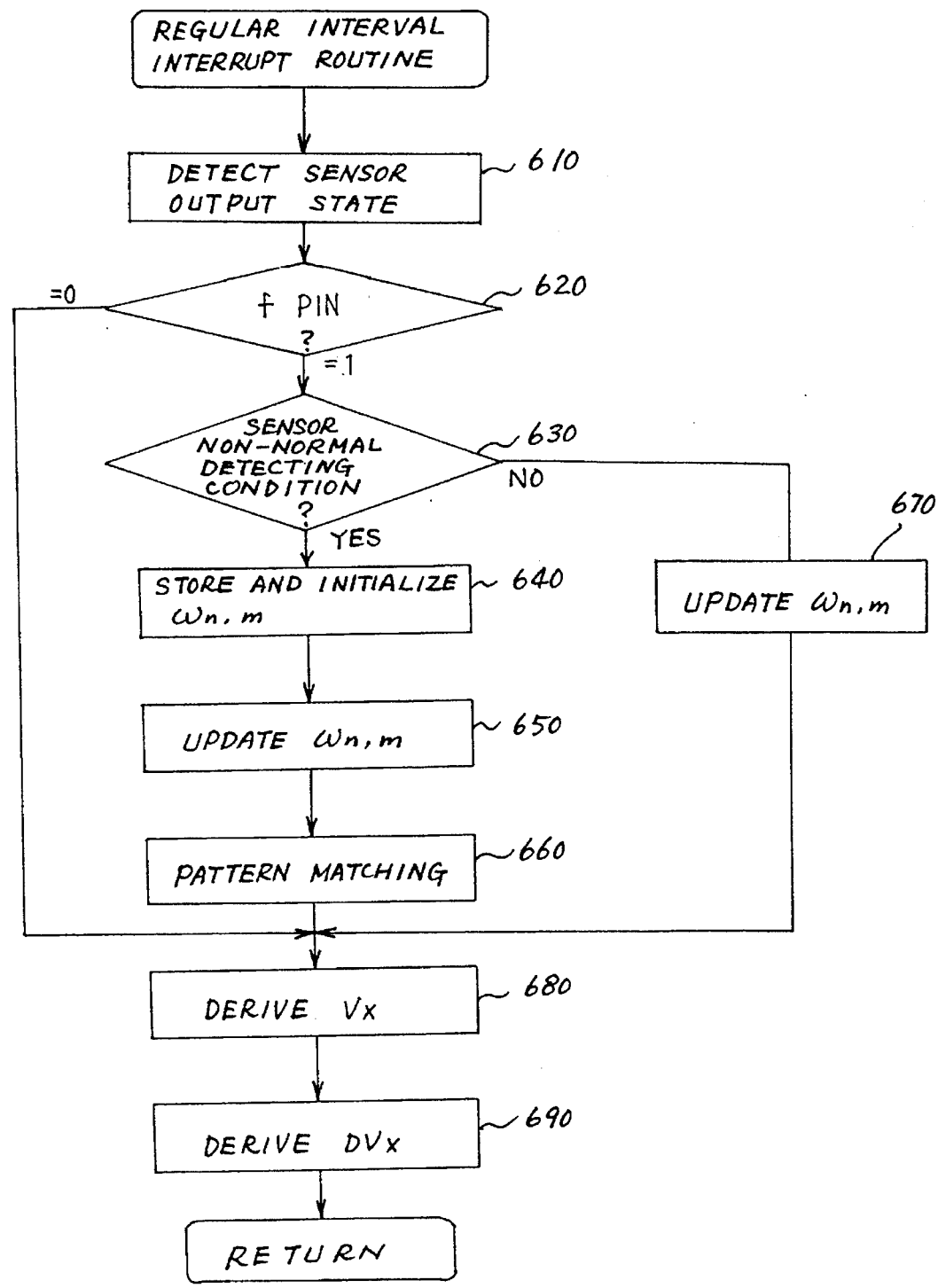
FIG. 23 is a flowchart showing a regular interval interrupt routine according to a fifth preferred embodiment of the present invention.

FIG. 23 shows a flowchart of a regular interval interrupt routine according to the fifth preferred embodiment. The processes not referred to in the following description are substantially the same as those in the first preferred embodiment. Accordingly, no further detailed description will be provided for those processes.

In FIG. 23, a first step 610 detects an output state of the speed sensor 12, 13. The detected sensor output state is used to determine whether to execute a store and initialize routine of a step 640.

Figure 24:
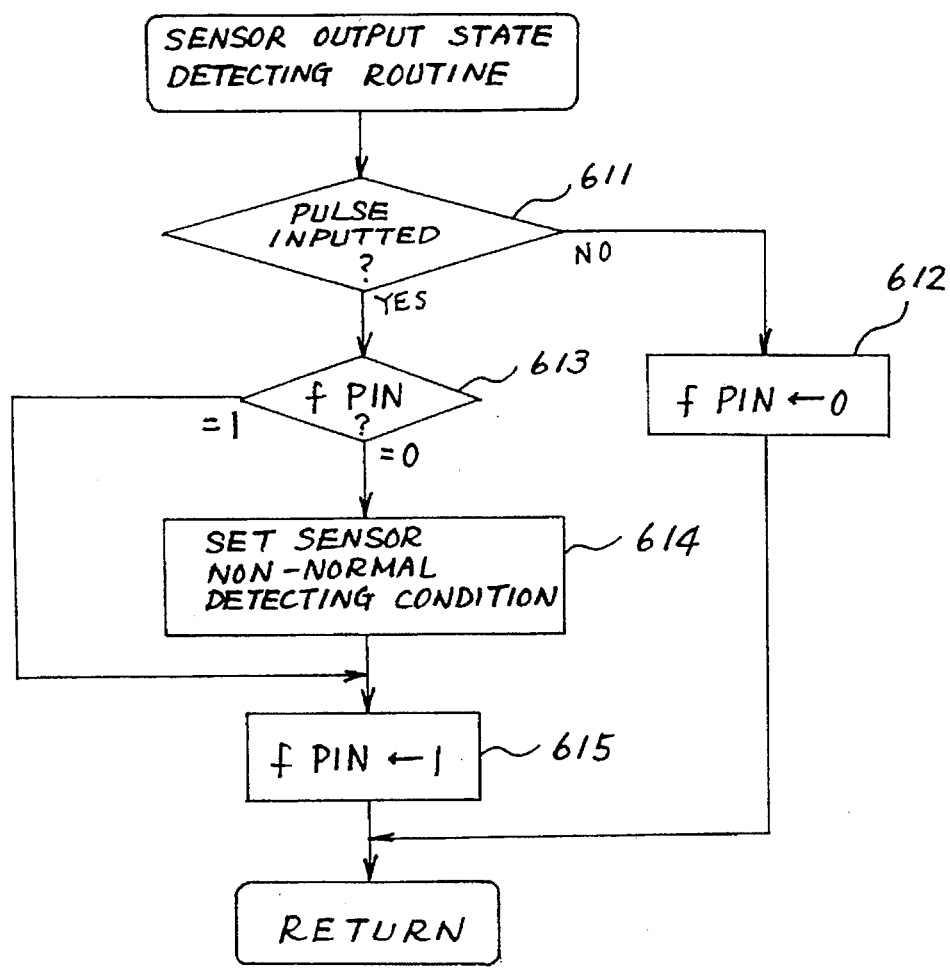
FIG. 24 is a flowchart showing a sensor output state detecting routine executed at a step 610 in FIG. 23.

FIG. 24 shows a flowchart of a sensor output state detecting routine executed at the step 610 in FIG. 23. In FIG. 24, a first step 611 determines whether a pulse input exists between the last and current execution cycles of the regular interval interrupt routine. If positive, the routine proceeds to a step 613. On the other hand, if negative, the routine proceeds to a step 612 where a flag $f_{PIN}$ is reset to "0", and then to a step 620 in FIG. 23.

At the step 613, it is checked whether the flag $f_{PIN}$ is set or reset, that is, whether the flag $f_{PIN}$ was set or reset in the last cycle of the regular interval interrupt routine. If the flag $f_{PIN}$ is set, the routine proceeds to a step 615. On the other hand, if the flag $f_{PIN}$ is reset, since no pulse input exists in the last execution cycle while the pulse input exists in the current execution cycle, it can be decided that the rotation speed of the rotating body increases from the low-speed rage as in the fourth preferred embodiment. In this situation, a possibility is high that a low-level pulse/pulses which can not be detected may exist between the last pulse in the previous execution cycle and the first pulse in the current execution cycle. Accordingly, it is necessary to re-calculate the correction coefficients for the first pulse in the current execution cycle and subsequent pulses. In order for this, the routine proceeds to a step 614 wherein a sensor non-normal detecting condition is set, and then to the step 615.

At the step 615, the flag $f_{PIN}$ is set. Thereafter, the routine proceeds to the step 620 in FIG. 23. The step 620 determines whether to update the correction coefficient, based on the condition of the flag $f_{PIN}$. Specifically, the step 620 allows the routine to proceed to a step 680 bypassing the steps 630 to 670 when the flag $f_{PIN}$ is reset. On the other hand, the step 620 allows the routine to proceed to the step 630 when the flag $f_{PIN}$ is set.

The step 630 determines whether the sensor non-normal detecting condition is set at the step 614 in FIG. 24. If such a condition is set at the step 614, the step 630 allows the routine to proceed to the step 640. At the step 640, the correction coefficients for the last one rotation cycle of the signal rotor 12, including the coefficients in the newest regular interval interrupt section, are stored in the RAM of the ECU 14 in the order of the rotation detecting sections of the signal rotor 12. In other words, the step 640 stores the correction coefficients of the rotation detecting sections (the rotation detecting section numbers 1–48) derived up to the current execution cycle of the regular interval interrupt routine. Thereafter, the step 640 initializes all of those correction coefficients to a value "1" while keeping the stored values of the correction coefficients. The routine then proceeds to the step 650.

On the other hand, the sensor non-normal detecting condition is not set at the step 614, the step 630 allows the routine to proceed to the steps 670 to 690 in sequence where the correction coefficients $\omega_{n,m}$ are updated and the wheel speed and the wheel acceleration are derived as in the first preferred embodiment.

At the step 650, the correction coefficients $\omega_{n,m}$ are updated as in the first preferred embodiment. Thereafter, the routine proceeds to the step 660 where a pattern matching is performed between the stored values of the correction coefficients and the correction coefficients updated at the step 650. The pattern matching executed at this step is for determining which of the stored correction coefficients the correction coefficients updated at the step 650 correspond to, that is, which of the correction coefficients derived before the sensor non-normal detecting condition is determined, the correction coefficients updated at the step 650 correspond to. Accordingly, through this pattern matching process, it can be decided which of the rotation detecting sections the correction coefficients updated at the step 650 correspond to. This males it possible that the rotation detecting sections resume the correctly corresponding correction coefficients derived before the determination of the sensor non-normal detecting condition in a short time. The step 660 further performs a process for determining whether the pattern matching is completed. This determination result is reflected on the correction process of a signal period $\Delta t_n$ in the pulse interrupt routine. Accordingly, the regular interval interrupt routine of this preferred embodiment derives the wheel speed and the wheel acceleration as in the first preferred embodiment irrespective of the completion of the pattern matching.

Figure 25:
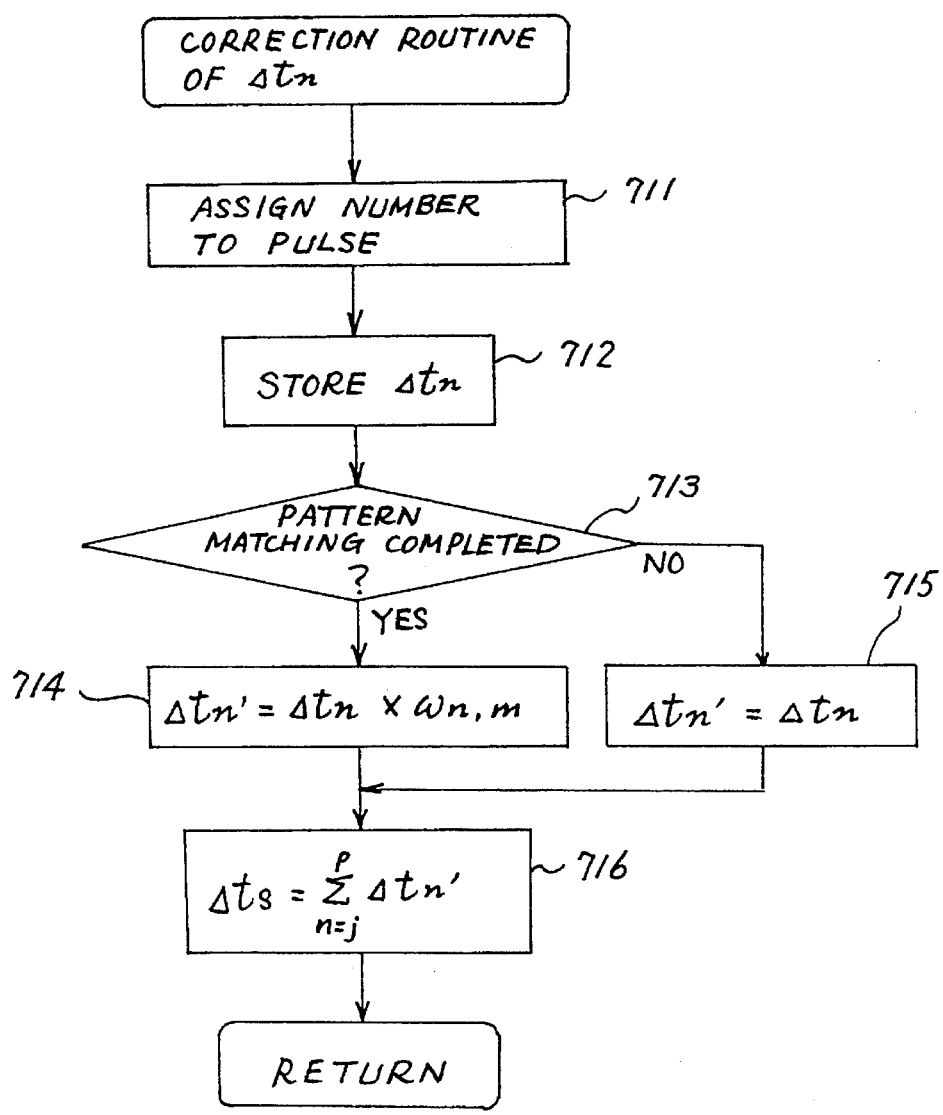
FIG. 25 is a flowchart showing a signal period correction routine according to the fifth preferred embodiment.

FIG. 25 shows a flowchart of a correction routine of the signal period $\Delta t_n$. The basic process of this correction routine is the same as that shown in FIG. 4 of the first preferred embodiment except that the step 123 in FIG. 4 is replaced by steps 713 to 715.

Specifically, after the signal period $\Delta t_n$ is stored at a step 712, the step 713 determines whether the pattern matching at the step 660 is completed. If positive at the step 713, the routine proceeds to the step 714 where the signal period $\Delta t_n$ is corrected using the correction coefficient $\omega_{n,m}$, and then to a step 716. On the other hand, if negative at the step 713, the routine proceeds to the step 715 where the signal period $\Delta t_n$ is not corrected, that is, the correction coefficient $\omega_{n,m}$ being "1", in order to prevent the derivation of the wheel speed and the wheel acceleration based on the erroneously corrected signal period $\Delta t_n'$.

Now, the pattern matching executed at the step 660 will be described in detail with reference to a flowchart of FIG. 26.

Figure 26:
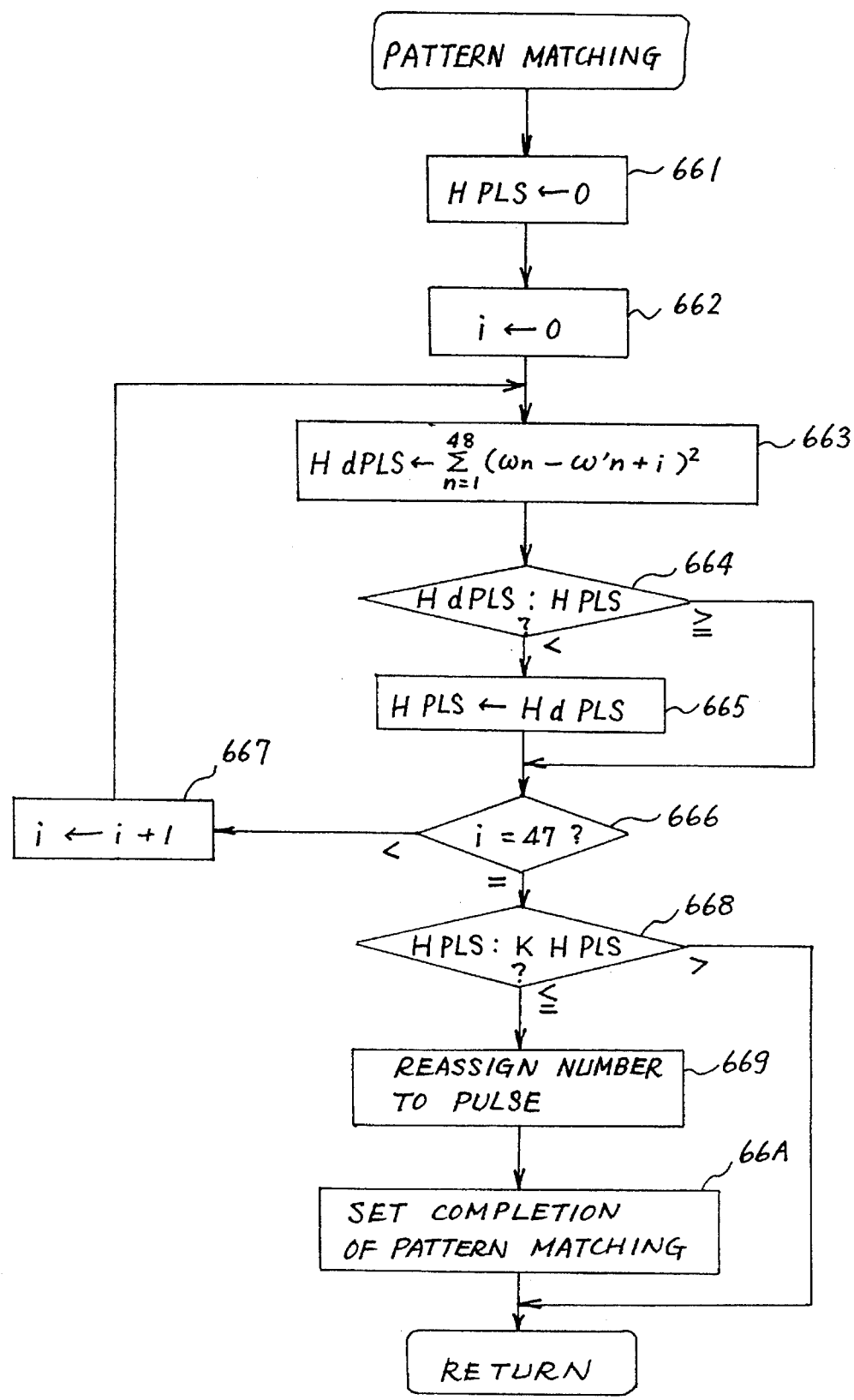
FIG. 26 is a flowchart showing a pattern matching routine executed at a step 660 in FIG. 23.

In FIG. 26, through steps 661 to 667, the new correction coefficients derived after the determination of the sensor non-normal detection condition and the correction coefficients stored at the step 640 are evaluated using the method of least squares.

Specifically, the first step 661 initializes an evaluation value $H_{PLS}$ to "0". Subsequently, the step 662 initializes a variable i indicative of a shift value of the rotation detecting sections to "0". Thereafter, the routine proceeds to the step 663 which derives an accumulated value of square errors using the following equation (13):

$$Hd_{PLS} = \sum_{n=1}^{48} (\omega_n - \omega'_{n+i})^2 \tag{13}$$

wherein, $\omega_n$ and $\omega'_n$ represent new and stored correction coefficients of the rotation detecting section number n, respectively, and n represents a recurring value from 1 to 48. For example, when n=45 and i=10, n+10=55→55−48=7.

Figure 27:
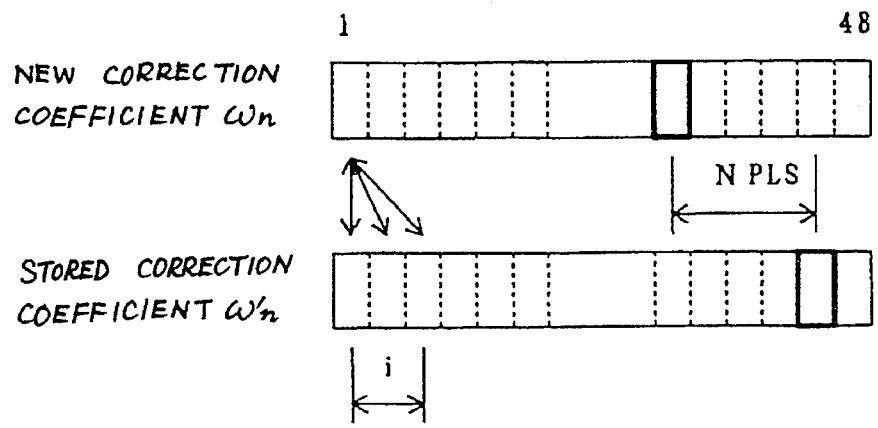
FIG. 27 is a diagram for explaining the concept of an equation which derives an accumulated value of square errors.

For reference, a diagram representing the concept of the equation (13) is shown in FIG. 27.

Subsequently, the routine proceeds to the step 664 where the square error accumulated value $Hd_{PLS}$ derived at the step 663 is compared with the evaluation value $H_{PLS}$. If $Hd_{PLS} < H_{PLS}$, the routine proceeds to the step 665 where the evaluation value $H_{PLS}$ is set to the accumulated value $Hd_{PLS}$. The step 665 further sets the current shift value i as $N_{PLS}$. Accordingly, at the step 665, the evaluation value $H_{PLS}$ is set to the minimum value with the corresponding shift value $N_{PLS}$. Thereafter, the routine proceeds to the step 666. On the other hand, if $Hd_{PLS} \geq H_{PLS}$, the routine directly proceeds to the step 666.

It is to be appreciated that, when i=0, the routine proceeds from the step 663 to the step 665 bypassing the step 664 so that the first derived accumulated value $Hd_{PLS}$ is set as $H_{PLS}$ and the shift value i (=0) is set as $N_{PLS}$.

The step 666 determines whether the shift value i reaches a value "47", that is, whether the accumulated values $Hd_{PLS}$ are derived at the step 663 corresponding to all the shift values i (=0–47). If not yet reached, the routine proceeds to the step 667 where the shift value i is incremented by "1" so as to repeat the processes at the steps 663 to 666. On the other hand, if the shift value i reaches the value "47", the routine proceeds to a step 668 where the evaluation value $H_{PLS}$ set at the step 665 is compared with a given value $KH_{PLS}$. The value $KH_{PLS}$ is indicative of a criterion value for determining whether the pattern matching is completed or not. Specifically, if $H_{PLS} \leq KH_{PLS}$, it is determined that the pattern matching is completed, and the routine proceeds to a step 669. On the other hand, if $H_{PLS} > KH_{PLS}$, it is determined that the pattern matching is incomplete, and the routine proceeds to the step 680 in FIG. 23. The criterion value $KH_{PLS}$ is provided so as to ensure that a sufficient number of the newly derived correction coefficients $\omega_n$ are evaluated at the step 663.

It is to be appreciated that, if $H_{PLS} > KH_{PLS}$ at the step 668, the routine proceeds from the step 670 (FIG. 23) to the step 660 in the next and subsequent execution cycles of the regular interval interrupt routine until answer at the step 668 becomes $H_{PLS} \leq KH_{PLS}$.

At the step 669, the rotation detecting section numbers are reassigned to the pulses. Specifically, the shift value $N_{PLS}$, which is set at the step 665 axed thus corresponds to the minimum evaluation value $H_{PLS}$, is added to each of the numbers assigned to the new pulses derived up to the current execution cycle of the regular interval interrupt routine. As appreciated, the addition of the shift value $N_{PLS}$ is performed in a recurring manner as explained with respect to the foregoing equation (13). As a result, thereafter, the stored correction coefficients can be applied to the correct rotation detecting sections.

The routine then proceeds to a step 66A where a state indicative of the completion of the pattern matching is set so that the step 713 in FIG. 25 can determine the completion of the pattern matching.

Due to a processing feature of the signal rotor 12, the teeth, i.e. the rotation detecting sections, of the signal rotor 12 may have a continuous large swell or wave during one rotation thereof. In this case, the step 663 in FIG. 26 may be replaced by the following equation (14):

$$H_{PLS} = (D_1 - D'_{1+i})^2 + \left( \sum_{n=1}^{2} D_n - \sum_{n=1}^{2} D'_{n+i} \right)^2 + \left( \sum_{n=1}^{3} D_n - \sum_{n=1}^{3} D'_{n+i} \right)^2 + \ldots + \left( \sum_{n=1}^{48} D_n - \sum_{n=1}^{48} D'_{n+i} \right)^2$$

$$= \sum_{n=1}^{48} \left( \sum_{n=1}^{m} D_n - \sum_{n=1}^{m} D'_{n+i} \right)^2 \quad (14)$$

wherein, n represents a recurring value from 1 to 48, $D_n$ represents $(\omega_n - 1)$ and $D'_n$ represents $(\omega'_n - 1)$.

Now, a sixth preferred embodiment of the present invention will be described hereinbelow.

The sixth preferred embodiment aims to correct a deviation of the correction coefficient due to an erroneous correction of a pulse signal period which is caused when the acceleration or deceleration continues for a certain time period.

Figure 28:
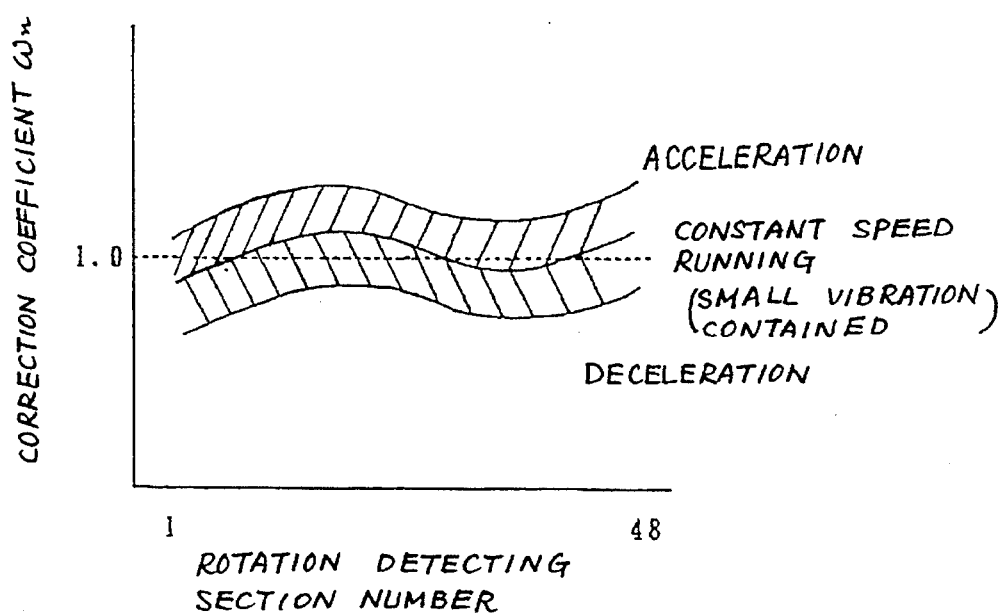
FIG. 28 is a diagram showing a time-domain variation of the correction coefficient when acceleration/deceleration continues for a certain time period.

For example, during the acceleration of the vehicle, the pulse signal periods are gradually reduced. Accordingly, the newest signal period is shorter than an average value S of 48 signal periods. In the foregoing preferred embodiments, each signal period is corrected so as to approach the average value S by multiplying the signal period by the corresponding correction coefficient $\omega_n$. Accordingly, when the acceleration continues for the certain time period, the correction to increase each signal period continues so that the correction coefficients of all the rotation detecting sections increase as compared with those in the constant speed running as shown in FIG. 28. To the contrary, during the deceleration of the vehicle, the correction coefficients become smaller as compared with those in the constant speed running as also shown in FIG. 28.

Accordingly, in the sixth preferred embodiment, the correction coefficient $\omega_n$ of the rotation detecting section is corrected using an average value of the correction coefficients ωn of all the rotation detecting sections, so as to correct the erroneous learning of the correction coefficients during the acceleration/deceleration of the vehicle.

Figure 29:
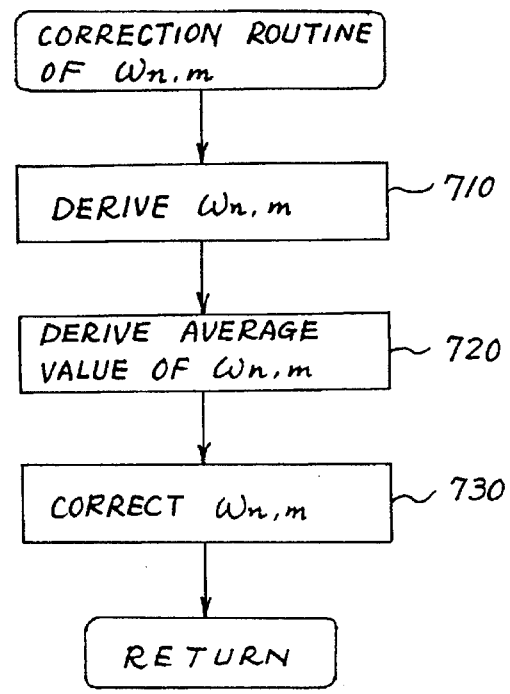
FIG. 29 is a flowchart showing a correction routine of the correction coefficient according to a sixth preferred embodiment of the present invention.

FIG. 29 shows a flowchart of a correction routine of the correction coefficients $\omega_n$. In FIG. 29, a first step 710 derives the correction coefficients; $\omega_n$ using the foregoing equation (3). Subsequently, a step 720 derives the average value of the correction coefficients $\omega_n$ of all the rotation detecting sections using the following equation (15):

$$\overline{\omega n} = \sum_{n=1}^{48} \omega_n / 48 \quad (15)$$

Thereafter, a step 730 corrects the correction coefficient $\omega_n$ using the following equations (16) and (17):

$$\omega_n = \omega_n - \Delta\omega_n \quad (16)$$

$$\Delta\omega_n = \omega_n - 1 \quad (17)$$

As appreciated, $\Delta\omega_n$ represents a hatched portion below or above the value "1" in FIG. 28, indicative of the deviation of the correction coefficient $\omega_n$ caused by the acceleration/deceleration of the vehicle. Accordingly, the erroneous learning of the correction coefficient $\omega_n$ due to the acceleration/deceleration of the vehicle can be corrected based on the equation (16).

Now, a seventh preferred embodiment will be described hereinbelow.

The seventh preferred embodiment aims to prevent the erroneous shift of the rotation detecting section numbers assigned to the inputted pulse,s, which is caused by breakage of the rotation detecting sections or: by adhesion of foreign materials to the rotation detecting sections.

Figure 30:
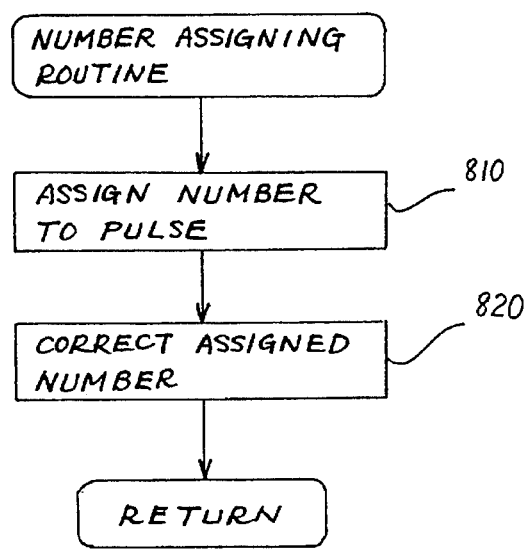
FIG. 30 is a flowchart showing a number assigning routine according to a seventh preferred embodiment of the present invention.

FIG. 30 shows a flowchart of a number assigning routine according to the seventh preferred embodiment. This number assigning routine corresponds to the step 121 in FIG. 4. In FIG. 30, a first step 810 assigns the rotation detecting section number to the received pulse. Subsequently, a step 820 corrects the rotation detecting section number assigned to the received pulse when the abnormal condition occurs.

Figure 31:
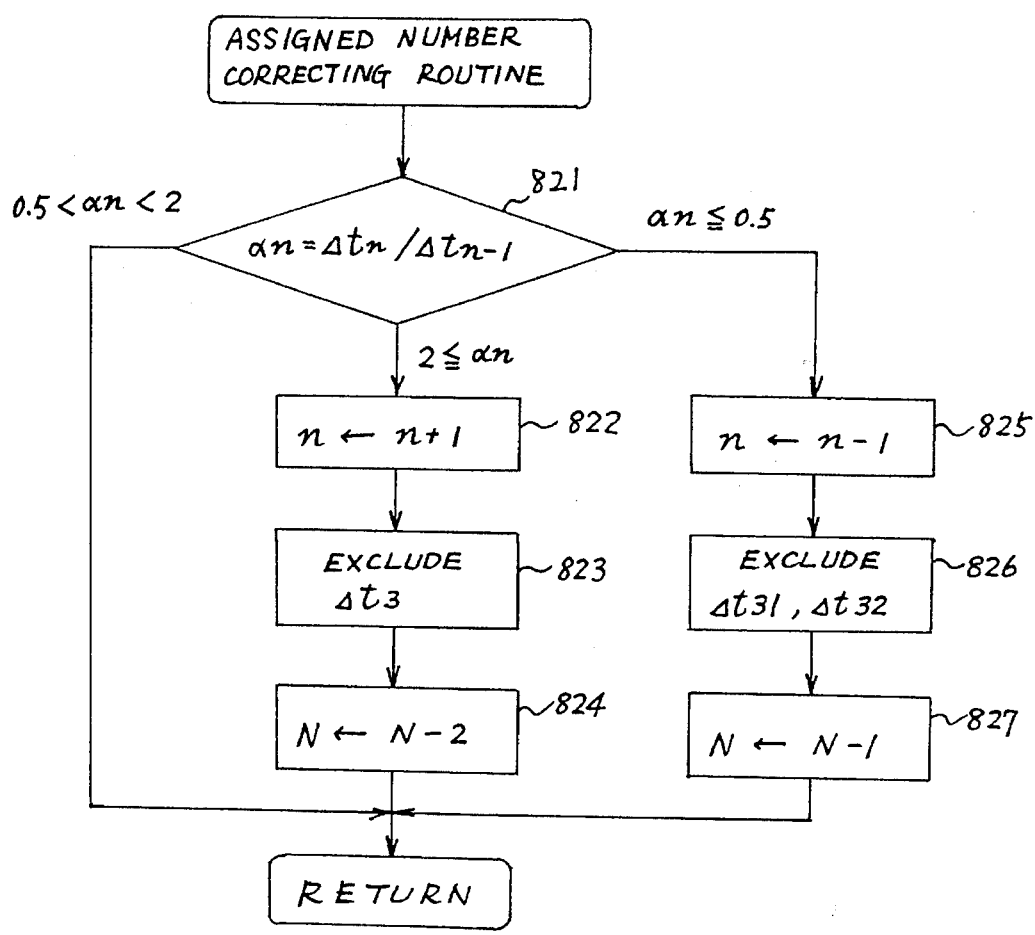
FIG. 31 is a flowchart showing an assigned number correcting routine executed at a step 820 in FIG. 30.

FIG. 31 shows a flowchart of an assigned number correcting routine executed at the step 820 in FIG. 30. In FIG. 31, a first step 821 detects the abnormal condition of the rotation detecting section by deriving a ratio of the newest signal period $\Delta t_n$ relative to the last signal period $\Delta t_{n-1}$ using the following equation (18):

$$\alpha_n = \Delta t_n / \Delta t_{n-1} \quad (18)$$

Figure 32:
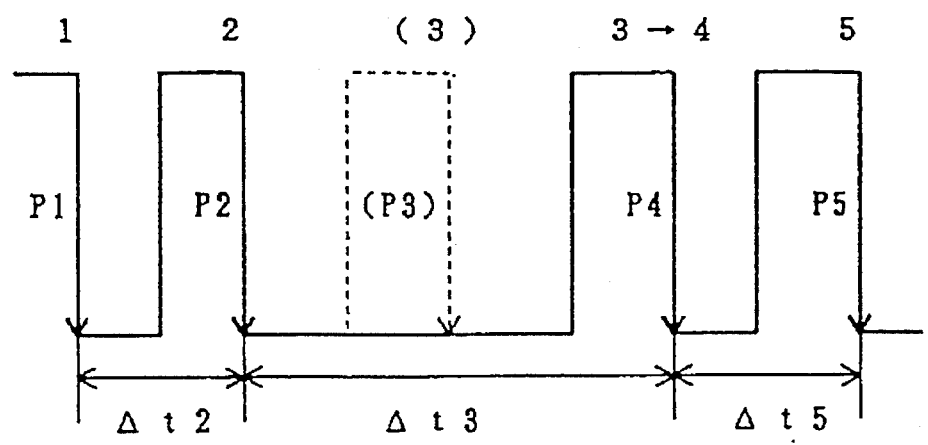
FIG. 32(A) is a diagram showing the state of the inputted pulses when one of rotation detecting section numbers, i.e. one of teeth of a signal rotor lacks.
FIG. 32(B) is a diagram showing the state of the inputted pulses when a false pulse is inputted between normal pulses.
Figure 32:
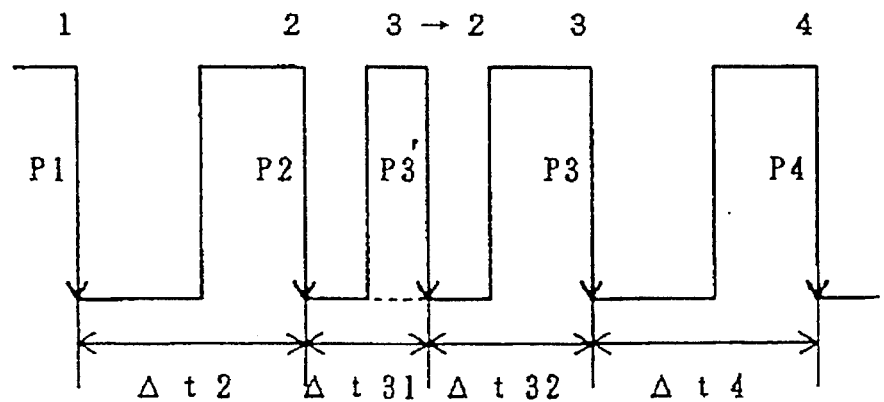

For example, when the rotation detecting section number 3 of the signal rotor 12 lacks, a value of the signal period $\Delta t_3$ is increased as shown in FIG. 32(A). Accordingly, when the step 821 determines that $\alpha_n \geq 2$, the routine proceeds to a step 822, as determining that the lack of the tooth of the signal rotor 12 occurs. As appreciated from FIG. 32(A), since a pulse P3 which should have been inputted is not inputted, the rotation detecting section numbers which should be assigned to the received pulses as 4, 5, 6, - - - becomes 3, 4, 5, - - - . This means that the rotation detecting section numbers to be assigned to the received pulses are reduced by "1". Accordingly, a step 822 adds "1" to the number n assigned to the received pulse at the step 810 (3→4). Since the signal period $\Delta t_3$ represents an abnormal signal period, a step 823 excludes $\Delta t_3$ so that $\Delta t_3$ is not used in deriving the correction coefficient $\omega_n$, the wheel speed and the wheel acceleration. Further, since $\Delta t_3$ and $\Delta t_4$ are canceled values, the total effective signal period number N for one rotation of the signal rotor 12 is reduced by "2". Accordingly, a step 824 sets the total effective number N to N−2, and this correcting routine is terminated.

On the other hand, as shown in FIG. 32(B), when a false pulse P3' is inputted between pulses P2 and P3 due to, such as, the adhesion of the foreign matters to the rotation detecting section of the signal rotor 12, a value of $\Delta t_{31}$ becomes small. Accordingly, when the step 821 determines that $\alpha_n \leq 0.5$, the routine proceeds to a step 825, as determining that the false pulse is inputted. As appreciated from FIG. 32(B), since the false pulse P3' which should not have been inputted, the rotation detecting section numbers which should be assigned to the received pulses as 3, 4, 5, - - - becomes 4, 5, 6, - - - . This means that the rotation detecting section numbers to be assigned to the received pulses are increased by "1". Accordingly, a step 825 subtracts "1" from the number n assigned to the received pulse at the step 810 (3→2). Since $\Delta t_{31}$ and $\Delta t_{32}$ represent abnormal signal periods, respectively, a step 826 excludes $\Delta t_{31}$ and $\Delta t_{32}$ so that $\Delta t_{31}$ and $\Delta t_{32}$ are not used in deriving the correction coefficient $\omega_n$, the wheel speed and the wheel acceleration. Further, since $\Delta t_3$ is a canceled value, the total effective signal period number N for one rotation of the signal rotor 12 is reduced by "1". Accordingly, a step 827 sets the total effective number N to N−1, and this correcting routine is terminated.

Finally, when the step 821 determines that $0.5 < \alpha_n < 2$, this correcting routine is terminated as determining that no abnormal condition of the corresponding rotation detecting section occurs.

Now, an eighth preferred embodiment of the present invention will be described hereinbelow.

The eighth preferred embodiment aims to eliminate variations of the correction coefficient generated by different causes, using a plurality of adaptive filters having different correction sensitive coefficients.

There are two causes which are considered to produce the aberration in signal periods as shown in FIG. 8(A). The first cause is the processing failure of the rotation detecting sections of the signal rotor 12, and the second cause is a variation in a tire shape due to the change of the running condition, such as, the wheel speed and the road surface condition.

Figure 33:
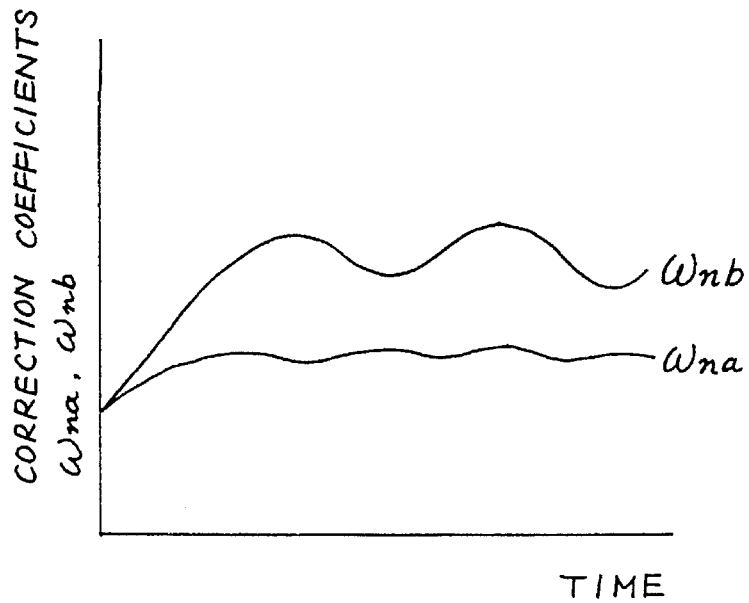
FIG. 33 is a diagram showing time-domain variations of correction coefficients which correct aberrations of the signal period produced by different causes, respectively.

FIG. 33 shows time-domain variations of correction coefficients $\omega_{na}$ and $\omega_{nb}$ which correct the aberrations of the signal period produced by the above-noted first and second causes, respectively. As seen from FIG. 33, the time-domain variations of the correction coefficients $\omega_{na}$ and $\omega_{nb}$ are different from each other since the vibration caused by the road surface condition and the vehicle acceleration/deceleration condition, which are the variation factors of the correction coefficients, influence the correction coefficients $\omega_{na}$ and $\omega_{nb}$ at different degrees. Accordingly, by providing in series first and second adaptive filters (each represented by the foregoing equations (3) to (5)) having correction sensitivity coefficients k1 and k2 which fit the respective time-domain variations of the correction coefficients $\omega_{na}$ and $\omega_{nb}$, the respective variations can be eliminated separately.

Now, a ninth preferred embodiment of the present invention will be described hereinbelow.

In the ninth preferred embodiment, the respective time-domain variations which are different from each other due to the foregoing first and second causes can be eliminated separately, using a single adaptive filter.

Figure 34:
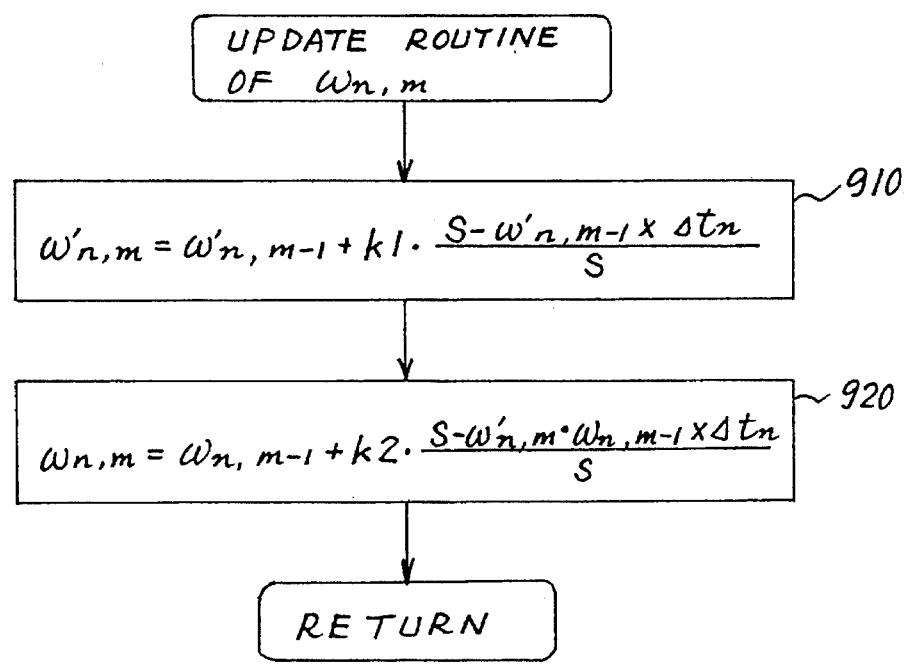
FIG. 34 is a flowchart of an update routine of the correction coefficient according to a ninth preferred embodiment of the present invention.

FIG. 34 shows a flowchart of an update routine of the correction coefficient $\omega_{n,m}$. As described in the foregoing eighth preferred embodiment, the correction coefficient has the two different states of the time-domain variations. Accordingly, a step 910 eliminates the variation of the correction coefficient corresponding to the foregoing first cause, using the following equations (19) and (20):

$$\omega'_{n,m} = \omega'_{n,m-1} \frac{S - \omega'_{n,m-1} \times \Delta t_n}{S} + K1 \quad (19)$$

$$S = \sum_{n=1}^{48} \Delta t_n / 48 \quad (20)$$

wherein, K1 represents a first correction sensitivity coefficient.

Subsequently, a step 920 eliminates the variation of the correction coefficient corresponding to the foregoing second cause, using the following equations (21) and (22):

$$\omega_{n,m} = \omega_{n,m-1} + \frac{S - \omega'_{n,m} \cdot \omega_{n,m-1} \times \Delta t_n}{S} K2 \quad (21)$$

$$S = \sum_{n=1}^{48} \Delta t_n / 48 \quad (22)$$

wherein, K2 represents a second correction sensitivity coefficient.

In the ninth preferred embodiment as structured above, the respective variations of the correction coefficient corresponding to the foregoing first and second causes can be eliminated by means of the single adaptive filter.

In the foregoing preferred embodiments, the present invention is applied to the speed detecting apparatus including the wheel speed sensor for the vehicle. The wheel speed and the wheel acceleration derived in the foregoing preferred embodiments can be effectively used, for example, in the anti-skid control system, the traction control system, the constant-speed running control system and the tire pressure detecting system. Further, the present invention can be applied not only to the speed detecting apparatus including the wheel speed sensor but also to all the other speed detecting apparatus as long as it detects a speed of a rotating body arranged at a place where the rotating body is subject to, such as, vibration.

As appreciated, in the foregoing preferred embodiments, the correction coefficients are converged to the values, respectively, which represent the aberration of the corresponding signal periods caused by the nonstandard factor, such as, the processing failure of the corresponding rotation detecting sections. Accordingly, the wheel speed and thus the wheel acceleration can be derived accurately.

Now, a tenth preferred embodiment of the present invention will be described hereinbelow.

In the tenth preferred embodiment, the wheel speed derived in the foregoing preferred embodiments is utilized in a tire pressure detecting apparatus.

Figure 35:
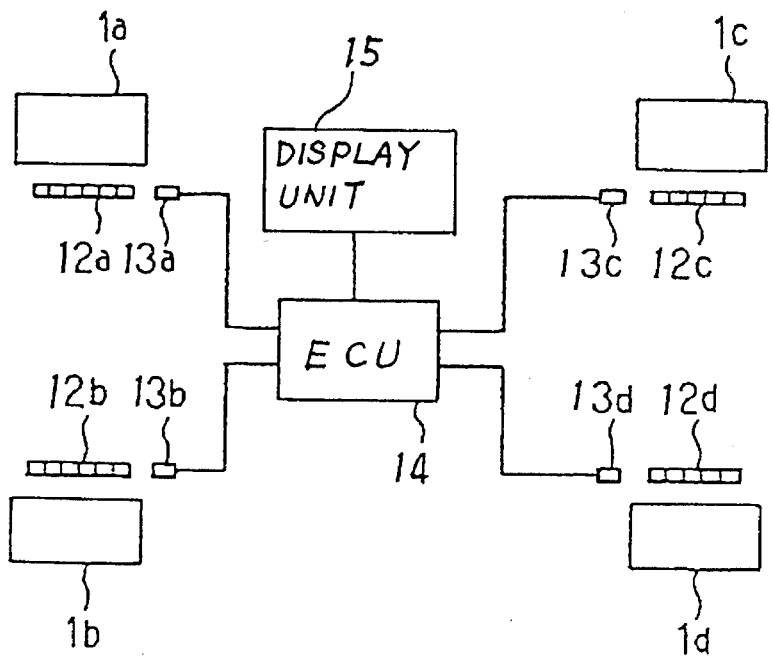
FIG. 35 is a schematic diagram showing the entire structure of a tenth preferred embodiment of the present invention.

FIG. 35 is a schematic diagram showing the entire structure of the tenth preferred embodiment.

In FIG. 35, wheel speed sensors are provided corresponding to vehicle wheels 1a to 1d. The wheels 1a and 1b are driven wheels while the wheels 1c and 1d are non-driven wheels. The wheel speed sensors include signal rotors 12a to 12d and corresponding electromagnetic pickups 13a to 13d, respectively. Each of the signal rotors 12a to 12d is formed of a disk-shaped magnetic material and coaxially mounted onto a rotation shaft (not shown) of the corresponding vehicle wheel. Each of the pickups 13a to 13d is disposed close to the corresponding signal rotor at a given distance therefrom and outputs the detection signal as the pickup 13 in the foregoing preferred embodiments. Specifically, each of the pickups 13a to 13d outputs the detection signal having signal periods indicative of a speed of the corresponding signal rotor, that is, of the corresponding vehicle wheel. Each of the detection signals from the pickups 13a to 13d is inputted to the ECU 14 so as to be processed as in the foregoing preferred embodiments so that the speeds of the four vehicle wheels 1a to 1d are accurately monitored. The ECU 14 further processes the monitored wheel speeds so as to monitor pressures of the four tires, respectively. The monitoring results of the tire pressures are inputted to a display unit 15 so as to inform a driver about the pressure conditions of the tires. The display unit 15 may display the pressure conditions of the four tires independently, or may include one alarm lamp which is lighted when any one of the tire pressures drops below a reference pressure, so as to inform it to the driver.

Now, the principle of detecting the tire pressure according to this preferred embodiment will be first described hereinbelow.

Figure 36:
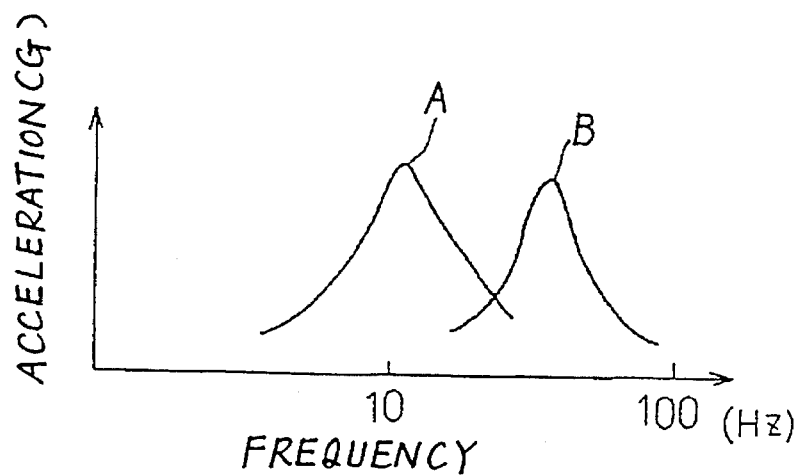
FIG. 36 is a diagram showing a frequency characteristic of acceleration of a vehicle unsprung mass.

For example, when the vehicle runs on the paved asphalt road surface, each tire is subject to forces in vertical (upward-downward) and longitudinal (forward-rearward) directions due to small roughness of the road surface so that each tire vibrates in the vertical and longitudinal directions due to the applied forces. FIG. 36 shows a frequency characteristic of acceleration of the vehicle unsprung mass during the corresponding tire vibration. As shown in FIG. 36, the frequency characteristic of the acceleration represents peak values at two points A and B. The point A represents a resonance frequency of the unsprung mass in the vertical directions, and the point B represents a resonance frequency of the unsprung mass in the longitudinal directions.

Figure 37:
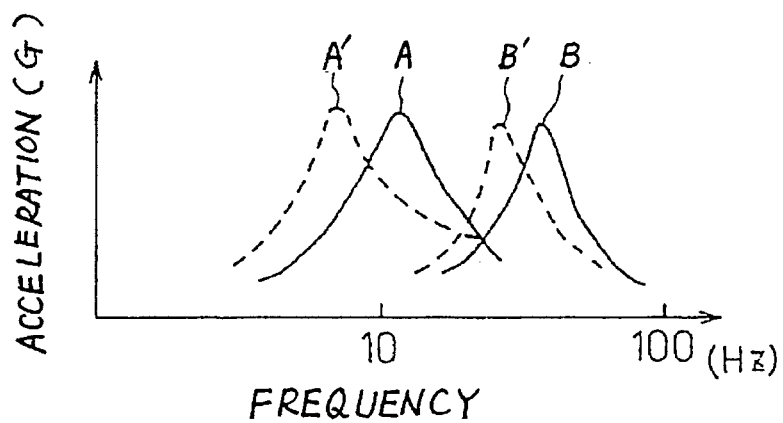
FIG. 37 is a diagram showing variations of resonance frequencies of the vehicle unsprung mass in vertical and longitudinal directions caused by a tire pressure change.

On the other hand, when the tire pressure changes, since a spring constant of a rubber portion of the tire also changes, both of the resonance frequencies in the vertical and longitudinal directions also change. For example, as shown in FIG. 37, when the tire pressure drops, the spring constant of the rubber portion of the tire also decreases so that both of the resonance frequencies in the vertical and longitudinal directions also decrease. Accordingly, by extracting at least one of the resonance frequencies in the vertical and longitudinal directions from the tire vibration frequencies, the tire pressure condition can be detected based on the extracted resonance frequency.

Figure 38:
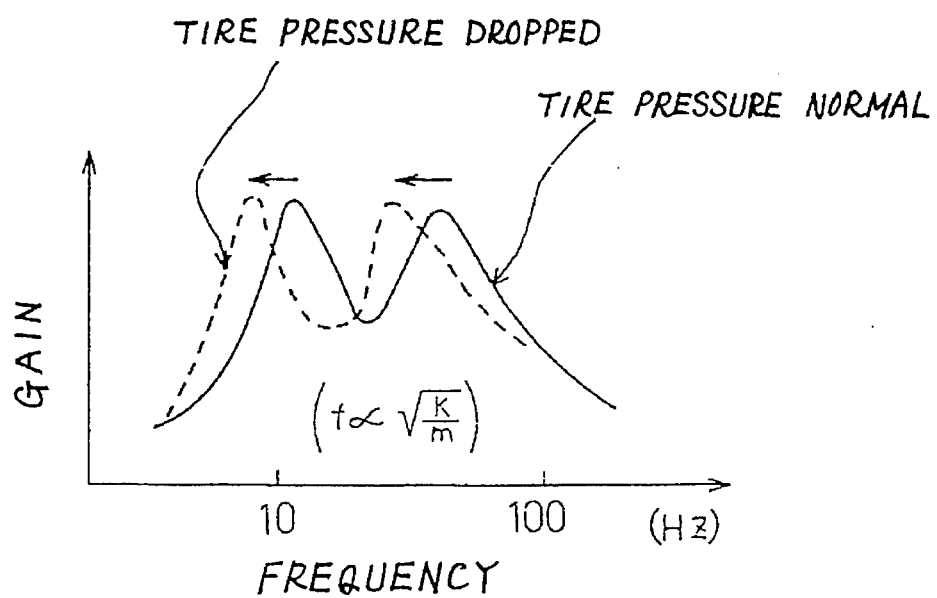
FIG. 38 is a diagram for explaining a principle of detecting a tire pressure according to the tenth preferred embodiment.

In order for this, in this preferred embodiment, the resonance frequency of the unsprung mass in the vertical or longitudinal direction is extracted from the detection signal outputted from the wheel speed sensor. It has been found out by the present inventors that the detection signal from the wheel speed sensor contains frequency components of the corresponding tire vibration. Specifically, as shown in FIG. 38, by performing a frequency analysis of the detection signal from the wheel speed sensor, it has been found out that peak values appear at two points of the frequencies and that these frequencies are both decreased when the tire pressure is lowered. Accordingly, by monitoring at least one of these frequencies, the tire pressure condition can be detected.

Since, for example, the anti-skid controlled vehicle has the wheel speed sensor for each of the wheels, the tire pressure detection can be performed according to this preferred embodiment without providing any additional sensors.

Figure 39:
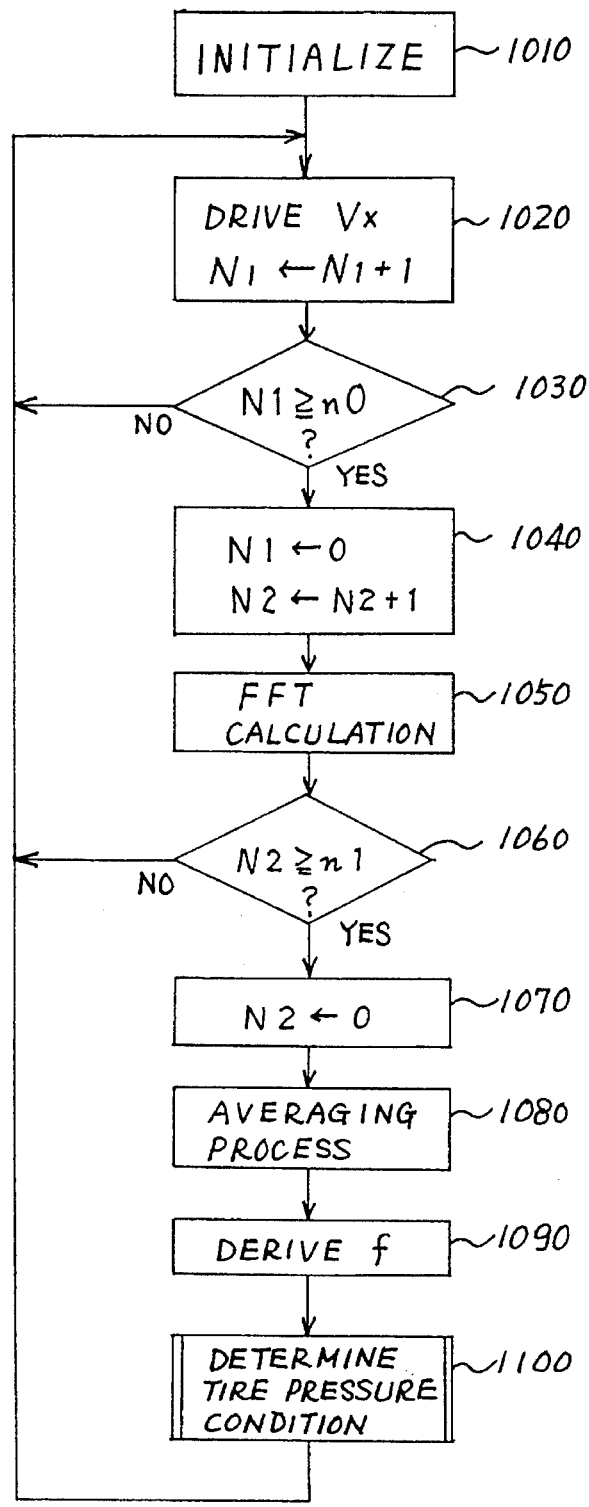
FIG. 39 is a flowchart of an overall routine for determining a tire pressure condition for each of four vehicle wheels according to the tenth preferred embodiment.

FIG. 39 shows a flowchart of a routine to be executed by the ECU 14 for determining a tire pressure condition for each of the four wheels. In the flowchart, the ECU 14 executes steps 1020 to 1090 for each of the vehicle wheels 1a to 1d in parallel, so as to derive required data for each of the wheels 1a to 1d. Subsequently, a step 1100 determines based on the data derived for the four wheels whether the tire pressure detection for one or more of the wheels 1a to 1d should be prohibited. The step 1100 does not perform the tire pressure detection for the wheel of which the tire pressure detection is prohibited. On the other hand, when the tire pressure detection is allowed for all the four wheels 1a to 1d, the step 1100 determines the tire pressure condition for each of the four wheels using a resonance frequency of the unsprung mass derived at the corresponding wheel. Further, when the tire pressure drops below a reference value, the step 1100 alarm the driver through the display unit 15. As appreciated, the alarm is performed for each of the tires.

In FIG. 39, at a first step 1010, various values stored in the RAM are initialized and set to initial values. Subsequently, at the step 1020, a wheel speed $V_x$ is derived as in the manner described in the foregoing preferred embodiments. The wheel speed $V_x$ is stored in the RAM to be used as data for a later-described frequency analysis using FFT (fast Fourier transform) (hereinafter also referred to as "FFT calculation"). Further, the step 1020 increments a counter N1 by "1" every time the wheel speed $V_x$ is derived, that is, every time this step is executed. Subsequently, the step 1030 determines whether the counter value N1 reaches a given value n0. The given value n0 is indicative of the number of data required for the FFT calculation. If N1<n0, the routine repeats the execution of the step 1020. On the other hand, if N1≧n0, the routine proceeds to the step 1040 which resets the counter value N1 to "0" and further increments a counter N2 by "1". The counter value N2 represents the number of execution times of the FFT calculations.

Figure 40:
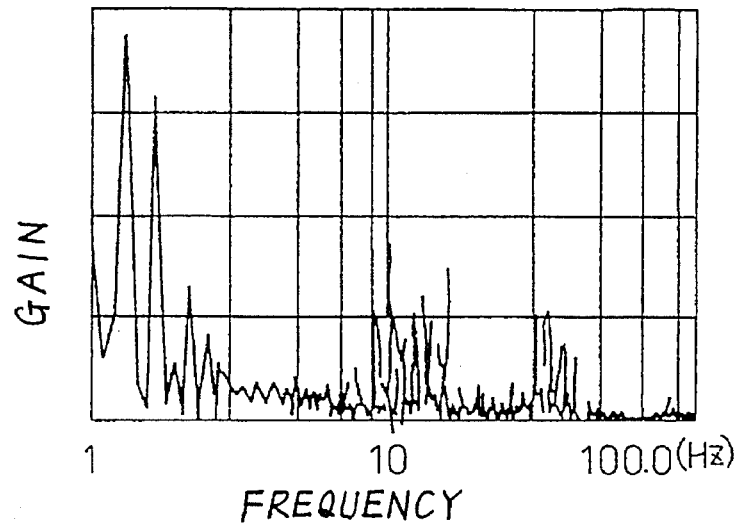
FIG. 40 is a diagram showing a waveform characteristic derived by performing a frequency analysis of wheel speed data.

Subsequently, the routine proceeds to the step 1050 wherein the FFT calculation of the wheel speeds $V_x$ derived at the step 1020 is executed. FIG. 40 shows an example of the result of the FFT calculation executed at the step 1050. As shown in FIG. 40, when the FFT calculation is performed to the wheel speeds derived by the vehicle running on the general road, the frequency characteristic normally becomes significantly random. This is caused by the irregularities on the road surface. Accordingly, the frequency characteristic varies per wheel speed data. In order to reduce this variation of the frequency characteristic as much as possible, the FFT calculations are executed plural times so as to derive an average of the results of the FFT calculations in this preferred embodiment. In this respect, the step 1060 determines whether the counter value N2 reaches a given value n1. If N2<n1, the routine repeats the execution of the steps 1020 to 1050.

Figure 41:
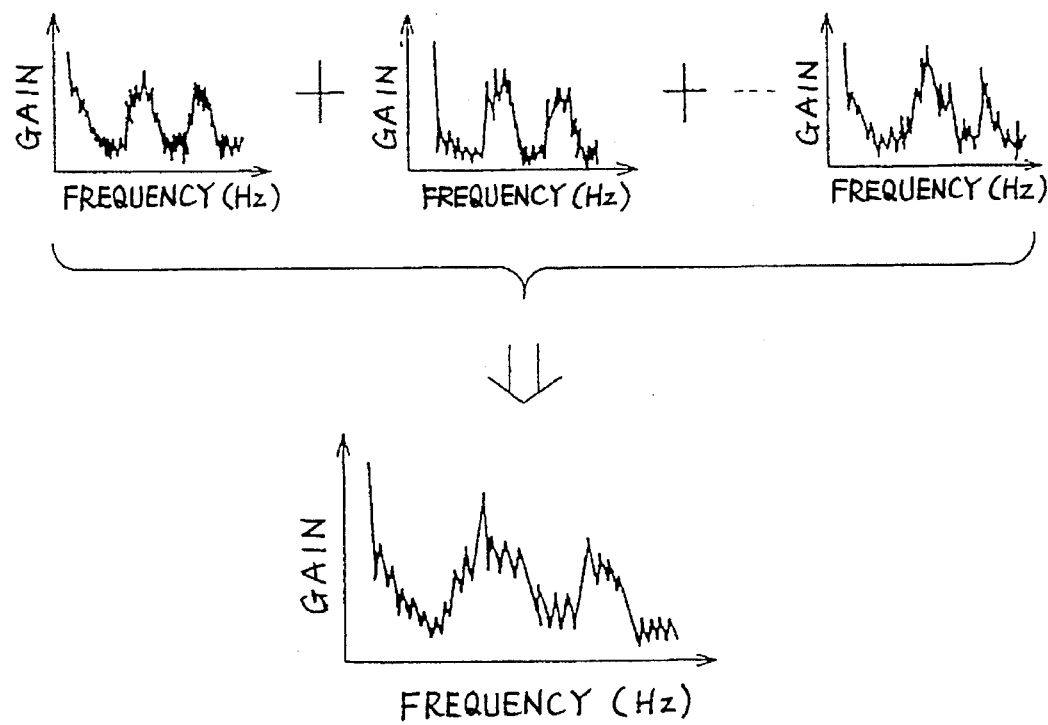
FIG. 41 is a diagram for explaining an averaging process of a plurality of the results of the frequency analysis of the wheel speed data.

On the other hand, if N2≧n1 at the step 1060, the routine proceeds to the step 1070 where the counter value N2 is cleared to "0", and then to the step 1080 where an averaging process is executed. As shown in FIG. 41, the averaging process is executed to derive an average of the results of the FFT calculations. Specifically, a mean value of gains of each of the frequency components is derived. By performing the averaging process, the variation of the FFT calculation results caused due to the irregularities on the road surface can be reduced.

Subsequently, the routine proceeds to the step 1090 where a resonance frequency f of the vehicle unsprung mass is derived based on the FFT calculation results averaged at the step 1080. As described before, the step 1090 is executed for each of the four wheels in parallel. Accordingly, the resonance frequency f of the unsprung mass is derived at each of the four wheels.

The routine now proceeds to the step 1100. As described before, at the step 1100, the tire pressure condition is determined for each of the tires and an alarm is displayed for the driver when the tire pressure drops below a preset lower limit.

Figure 42:
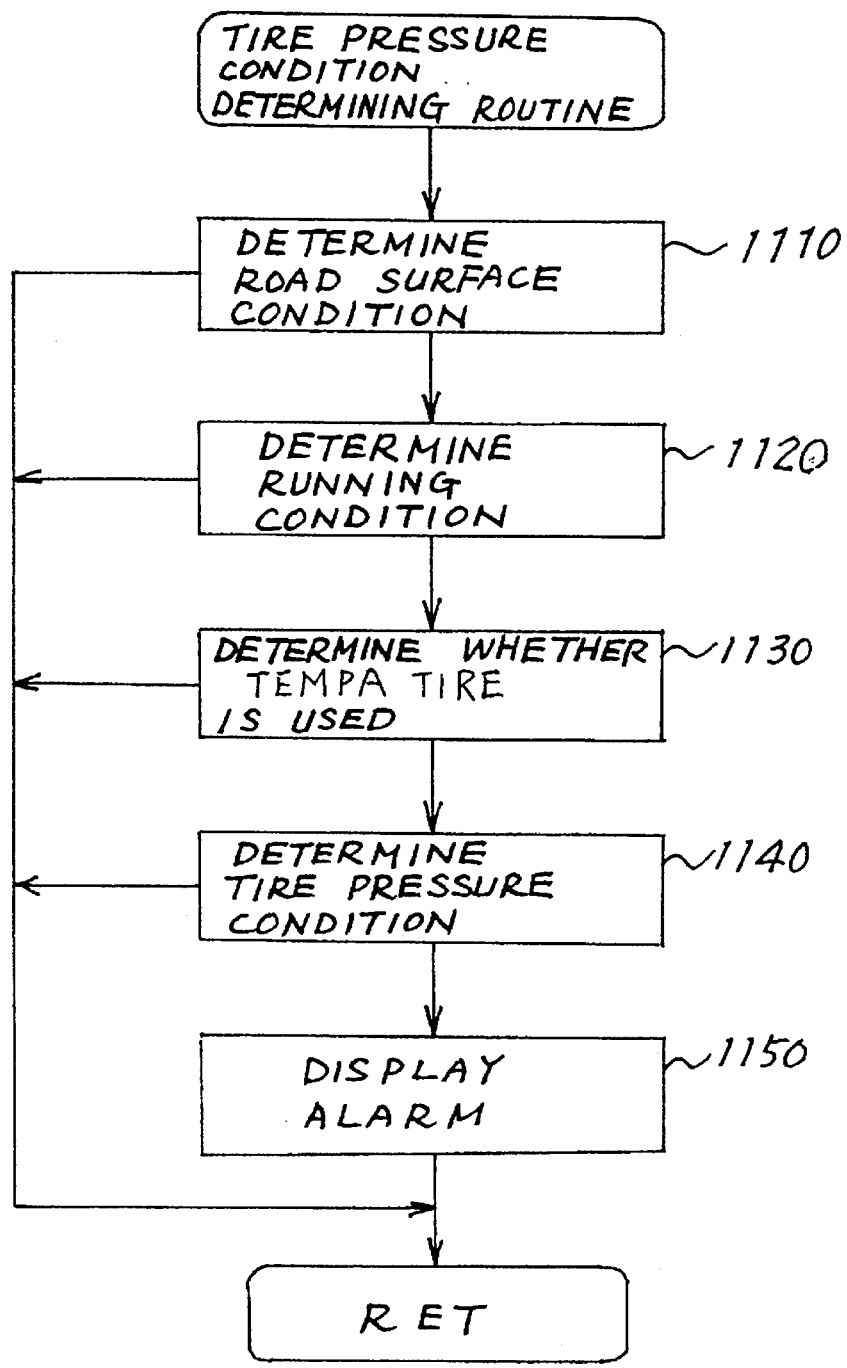
FIG. 42 is a flowchart showing a tire pressure condition determining routine executed at a step 1100 in FIG. 39.

FIG. 42 shows a flowchart of a tire pressure condition determining routine executed at the step 1100 in FIG. 39. In FIG. 42, steps 1110 to 1130 respectively determine whether a step 1140, which determines the tire pressure condition, should be executed.

Figure 48:
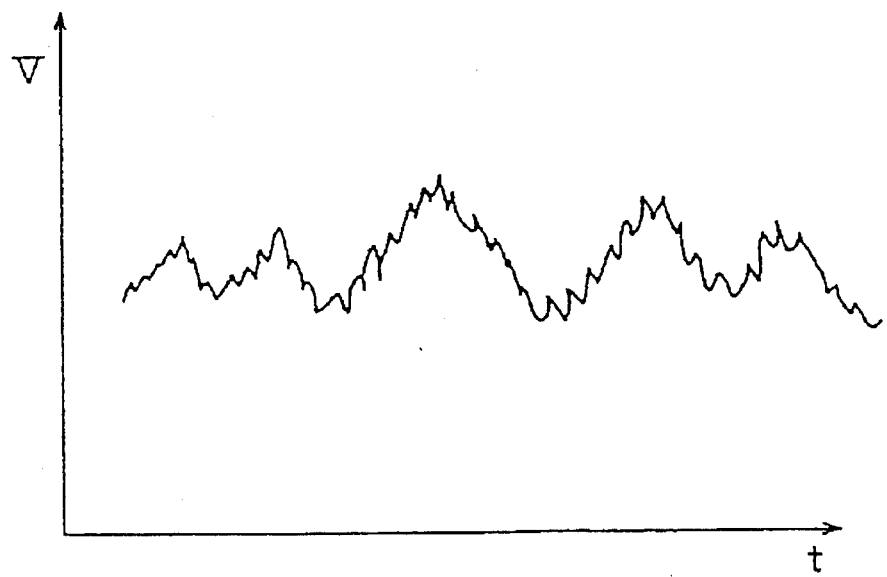
FIG. 48 is a diagram showing wheel speeds as time series data.
Figure 49:
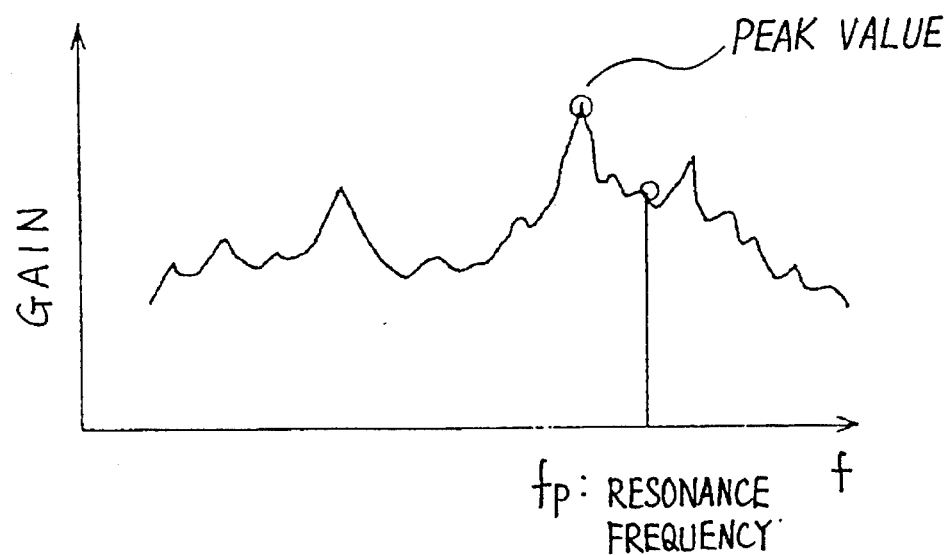
FIG. 49 is a diagram showing the wheel speeds as frequency data.

Specifically, the step 1110 detects a condition of the road surface on which the vehicle is running, so as to determine whether to execute the step 1140. When the vehicle runs on the bad conditioned road surface, such as, the gravel road, the derived wheel speed data $V_x$ include vibration components corresponding to the roughness of the road surface as noise as seen from FIG. 48 which shows the derived wheel speeds as time series data. Accordingly, the accuracy of the extracted resonance frequency of the unsprung mass is reduced since it is possible that a frequency corresponding to a peak value caused by the bad conditioned road surface is erroneously extracted as a resonance frequency as seen from FIG. 49 which shows the derived wheel speeds as frequency data.

The vibration caused by the bad conditioned road surface appears in the detected wheel speed data in a continuous manner while the resonance vibration component caused by the unsprung mass appears in the detected wheel speed data in a discontinuous manner. Further, an amplitude of the vibration caused by the bad conditioned road surface is normally sufficiently greater than that of the unsprung mass resonance vibration component. Accordingly, by monitoring a time-domain variation of the detected wheel speed data, the vibration caused by the bad conditioned road surface can be detected.

Figure 43:
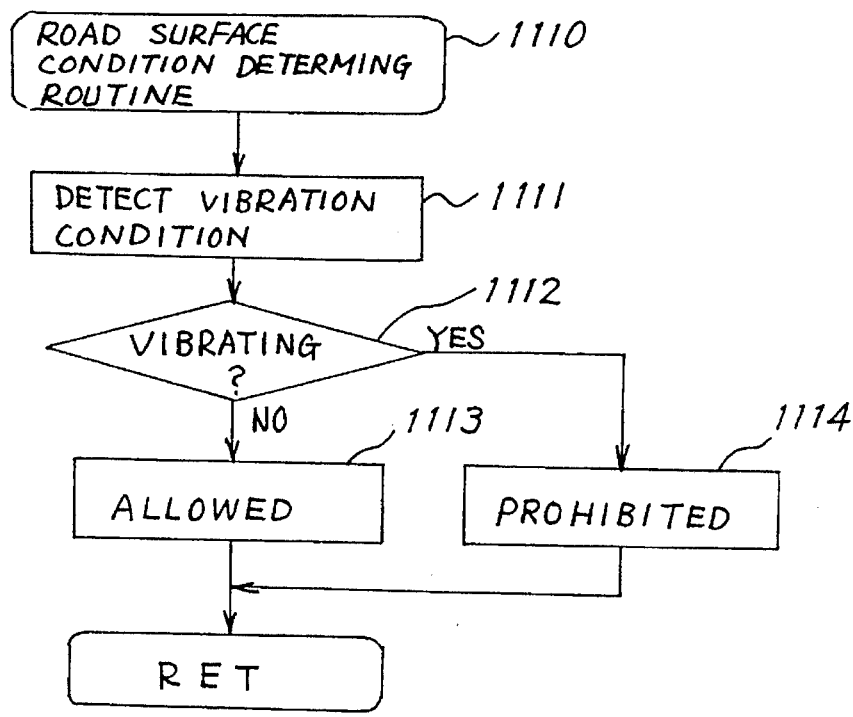
FIG. 43 is a flowchart showing a road surface condition determining routine executed at a step 1110 in FIG. 42.

FIG. 43 shows a flowchart of a road surface condition determining routine executed at the step 1110 in FIG. 42. In FIG. 43, a first step 1111 detects a vibrating condition of the non-driven wheel. Although the vibration caused by the bad conditioned road surface appears in the wheel speed data irrespective of the driven or non-driven wheel, since the wheel speed data of the driven wheel possibly contains later-described vibration caused by the vehicular system, it is preferable to detect the vibrating condition of the non-driven wheel at the step 1111.

Figure 44:
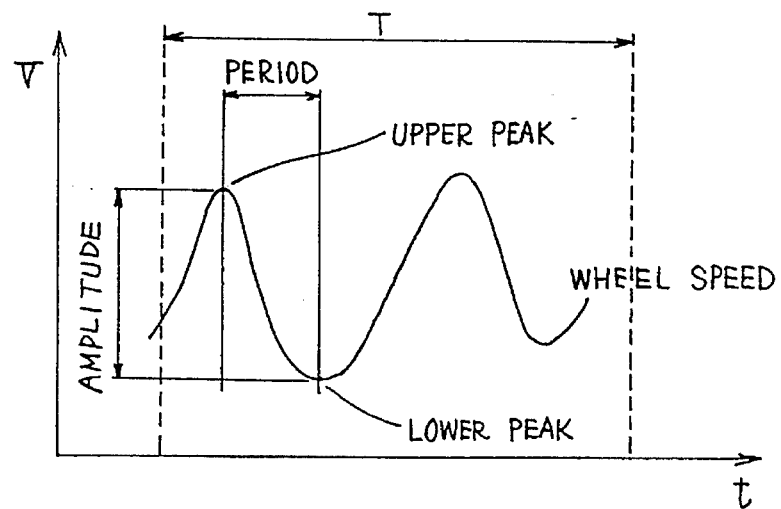
FIG. 44 is a diagram for explaining how to detect vibration caused by a bad conditioned road surface.

As shown in FIG. 44, in order to detect the vibration caused by the bad conditioned road surface, the step 1111 monitors amplitudes and periods between upper and lower peaks of vibrations contained in the wheel speed data within a given time T. The step 1111 further monitors the number of the vibrations each having the amplitude and the period both being greater than respective given comparison values. When the monitored number is equal to or greater than two, a step 1112 determines that the vibration is caused by the bad conditioned road surface. In this case, the routine proceeds to a step 1114 where the execution of the tire pressure condition determining process to be executed at the step 1140 in FIG. 42 is prohibited. On the other hand, when the step 1112 determines otherwise, the routine proceeds to a step 1113 where the execution of the step 1140 is allowed.

The routine of FIG. 43 may be executed only for one of the non-driven wheels so that, when this non-driven wheel reveals that the vibration is caused by the bad conditioned road surface, the execution of the step 1140 is prohibited for all the tires. On the other hand, it may be arranged that the routine of FIG. 43 is executed for both of the non-driven wheels so that, when at least one of them reveals that the vibration is caused by the bad conditioned road surface, the execution of the step 1140 is prohibited for all the tires. Further, it may be arranged that, when the left non-driven wheel reveals such a vibration condition while the right non-driven wheel does not reveal such a vibration condition, the execution of the step 1140 is prohibited only for the left non-driven and driven wheels while allowed for the right non-driven and driven wheels, and vice versa.

Referring back to FIG. 42, when the step 1110 prohibits the execution of the step 1140 for all the tires, the routine returns to the step 1020 in FIG. 39. On the other hand, when the step 1110 allows the execution of the step 1140 for at least one of the tires, the routine proceeds to a step 1120.

Figure 45:
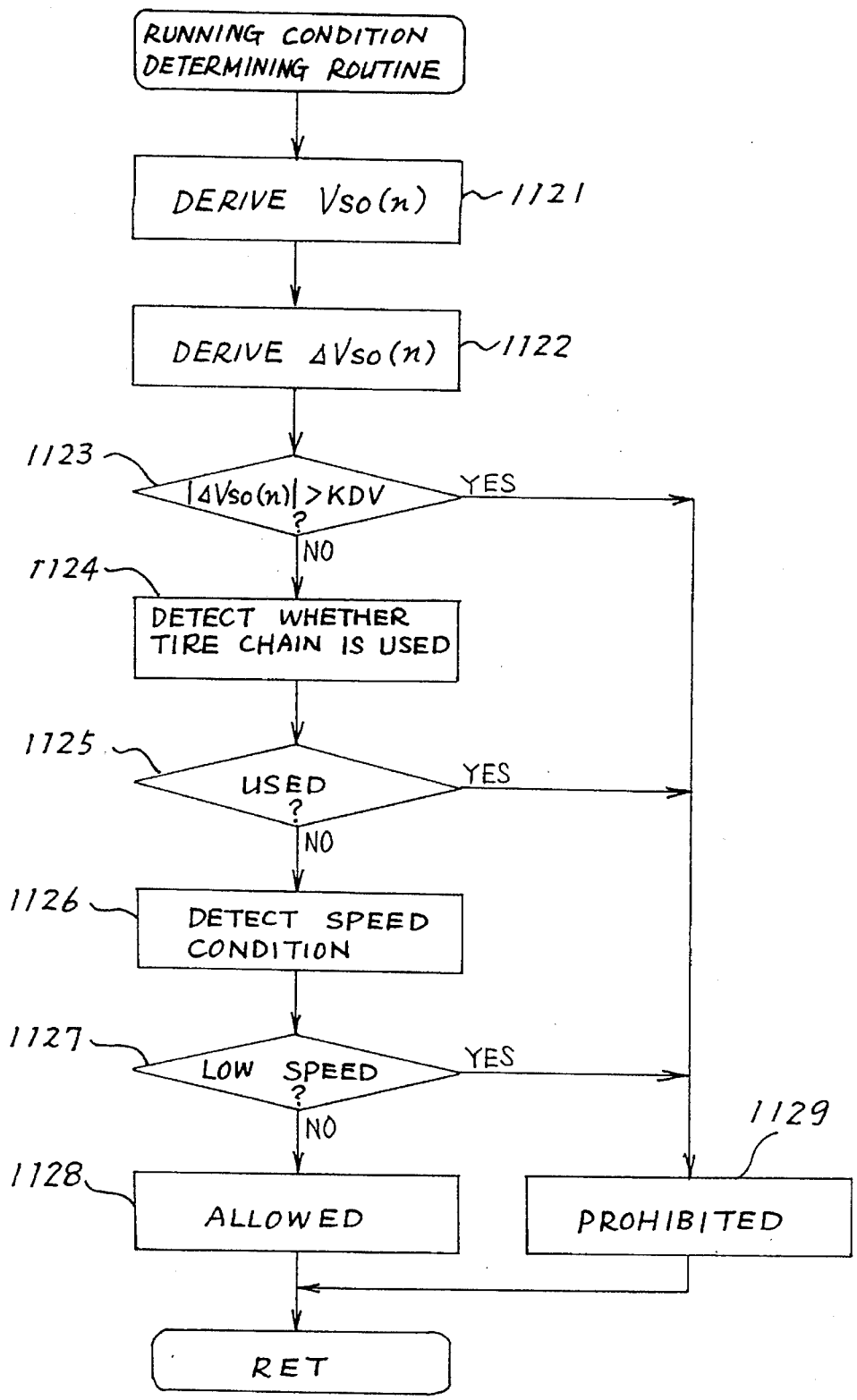
FIG. 45 is a flowchart showing a running condition determining routine executed at a step 1120 in FIG. 42.

The step 1120 determines the running condition of the vehicle. The running conditions which prohibit the execution of the step 1140 include the following cases:
(1) brake being applied;
(2) under acceleration;
(3) tire chain being used;
(4) running at low speed FIG. 45 shows a flowchart of a running condition determining routine executed at the step 1120 in FIG. 42. In FIG. 45, a first step 1121 derives a vehicle speed $V_{SO}$ based on the wheel speeds $V_{WPR}$, $V_{WPL}$ of the non-driven wheels, using the following equation (23):

$$V_{SO}(n) = \text{Med}\{\text{Max}(V_{WPR}, V_{WPL}), V_{SO}(n-1) + \alpha UP \cdot \Delta t, V_{SO}(n-1) - \alpha DW \cdot \Delta t\} \quad (23)$$

wherein, Med and Max represent functions for selecting an intermediate value and a maximum value in brackets, respectively, and $\alpha UP$ and $\alpha DW$ represent an acceleration guard value and a deceleration guard value, respectively, and $\Delta t$ represents an interval between the vehicle speed calculations.

The reason for using the wheel speeds of the non-driven wheels in deriving the vehicle speed is that, since the non-driven wheel is not liable to slip as compared with the driven wheel, the non-driven wheel speed closely reflects the vehicle speed as compared with the driven wheel speed. Further, in consideration of occurrence of the non-driven wheels being locked when running, for example, on a low friction road, an intermediate value among maximum right and left wheel speeds and upper and lower vehicle speed limits regulated by the given values $\alpha UP$, $\alpha DW$ is derived as the vehicle speed $V_{SO}(n)$. This improves an estimation accuracy of the vehicle speed as proved in the known anti-skid control system and traction control system.

Thereafter, the routine proceeds to a step 1122 which derives a variation $\Delta V_{SO}$ per given time period, using the following equation (24):

$$\Delta V_{SO}(n) = V_{SO}(n) - V_{SO}(n-1) \quad (24)$$

Subsequently, the routine proceeds to a step 1123 where the absolute value of $\Delta V_{SO}(n)$ is compared with a given value KDV so as to determine whether the vehicle is accelerating or decelerating (being braked) beyond the given value. If $|\Delta V_{SO}(n)| > KDV$ at the step 1123, the routine proceeds to a step 1129 where the execution of the step 1140 is prohibited for all the tires. Specifically, if $|\Delta V_{SO}(n)| > KDV$, it is determined that torsional vibration components caused by the vehicular system during acceleration or deceleration are contained in the wheel speed data. Specifically, during acceleration or deceleration, the torsional vibration of shafts between the engine and the tire is caused due to the engine or the driving system of the vehicle and transmitted to the tire so as to be included in the wheel speed data. On the other hand, if $|\Delta V_{SO}(n)| \leq KDV$ at the step 1123, the routine proceeds to a step 1124.

It may be arranged to set given values KDV for the acceleration and the deceleration, respectively, so that $\Delta V_{SO}(n)$ is compared with one of them according to a sign thereof. Further, the acceleration and the deceleration may be detected using sensors for detecting the driver's operation of an accel pedal and a brake pedal.

At the step 1124, it is detected whether the tire chain is used.

Figure 46:
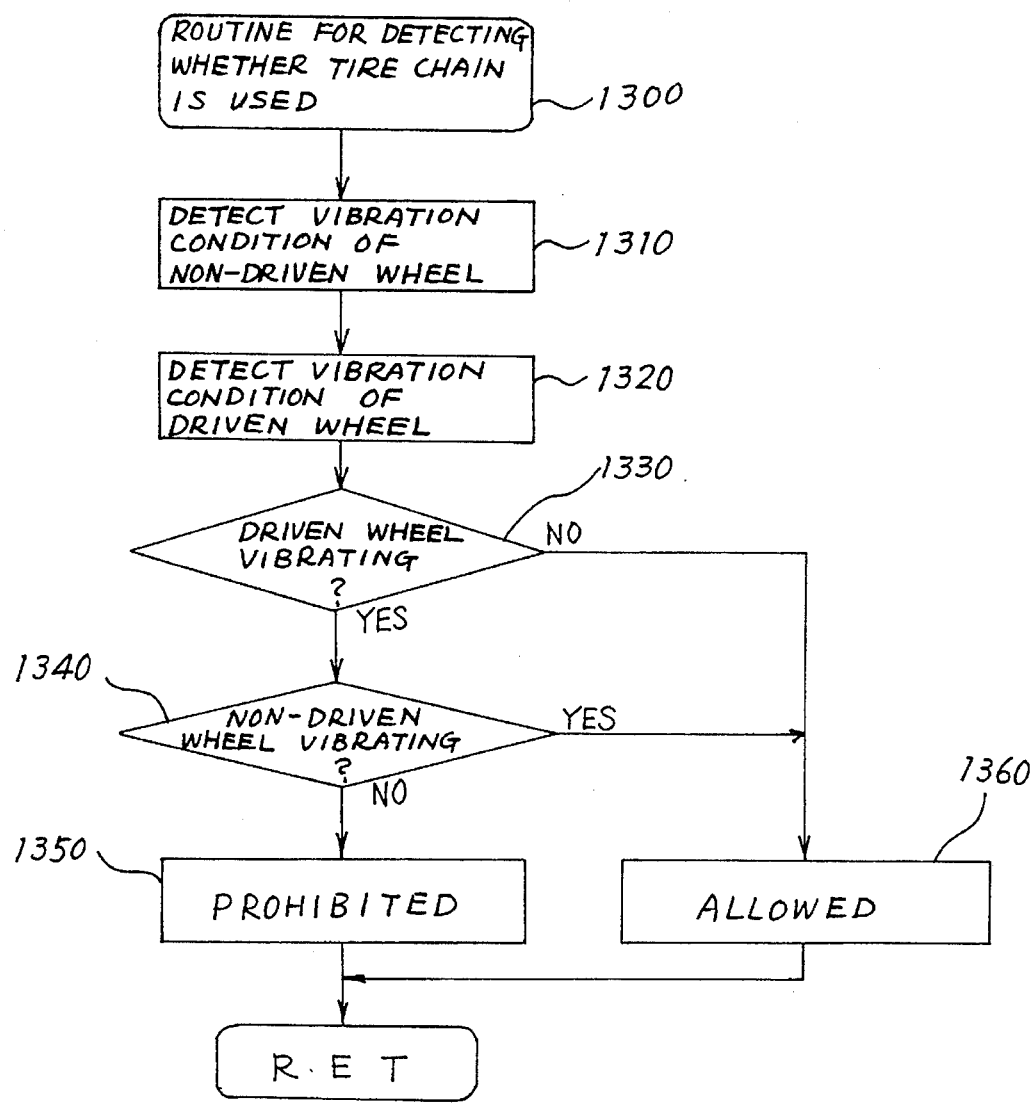
FIG. 46 is a flowchart showing a routine for detecting whether a tire chain is used, executed at a step 1124 in FIG. 45.

FIG. 46 shows a flowchart of a routine for detecting whether the tire chain is used, executed at the step 1124. The tire chains are normally mounted onto the driven wheels so that the vibration of the driven wheel becomes greater than that of the non-driven wheel. Accordingly, by comparing the wheel speed data between the driven wheel and the non-driven wheel, the mounting of the tire chain can be detected.

Specifically, in FIG. 46, a first step 1310 detects a vibration condition of one of the non-driven wheels. Subsequently, a step 1320 detects a vibration condition of one of the driven wheels. As appreciated, the vibration caused by the tire chain can be detected in a manner substantially the same as that for detecting the vibration caused by the bad conditioned road surface as executed at the step 1111 in FIG. 43. In this case, the comparison value for the amplitude of the vibration used at the step 1111 may be set smaller. Subsequently, when it is determined through steps 1330 and 1340 that the vibration caused by the tire chain is detected only for the driven wheel, the routine proceeds to a step 1350 where the tire chain mounting condition is set ON representing that the tire chain is used. Otherwise, the routine proceeds to a step 1360 where the tire chain mounting condition is set OFF representing that the tire chain is not used.

Referring back to FIG. 45, when a step 1125 determines that the tire chain mounting condition is set ON, the routine proceeds to the step 1129 where the execution of the step 1140 in FIG. 42 is prohibited for all the tires. On the other hand, when the step 1125 determines that the tire chain mounting condition is set OFF, the routine proceeds to a step 1126.

It may be arranged that, when the mounting of the tire chain is detected, the execution of the step 1140 is prohibited only for the driven tires.

The step 1126 may be executed for one of the wheels. The step 1126 checks the numbers of the pulses inputted from the wheel speed sensor within the last and newest regular interval interrupt sections, respectively. The wheel speed can be derived only when each of the last and newest regular interval interrupt sections includes at least one input pulse from the speed sensor. Accordingly, a step 1127 allows the routine to proceed to a step 1128, where the execution of the step 1140 in FIG. 42 is allowed, only when each of the last and newest regular interval interrupt sections includes at least one input pulse. Otherwise, the step 1127 determines the low-speed running condition of the vehicle so that the routine proceeds to the step 1129 where the execution of the step 1140 in FIG. 42 is prohibited for all the tires.

It may be arranged that the step 1126 may be executed for each of the wheels. In this case, it may be further arranged that, when at least one, at least two, at least three or all of the wheels do not satisfy the condition to proceed to the step 1128, the execution of the step 1140 is prohibited for all the tires, and otherwise, the execution of the step 1140 is allowed for all the tires.

Referring back to FIG. 42, when the execution of the step 1140 is prohibited at the step 1120, the routine returns to the step 1020 in FIG. 39. On the other hand, when the execution of the step 1140 is allowed at the step 1120, the routine proceeds to a step 1130.

At the step 1130, it is determined whether a tempa tire, i.e. a temporary use spare tire is used. Except for a special kind vehicle, the tempa tire has a diameter smaller than that of a normal tire. Accordingly, the speed of the wheel wearing the tempa tire becomes higher than the speed of the other wheels so that the wearing of the tempa tire can be easily detected.

Figure 47:
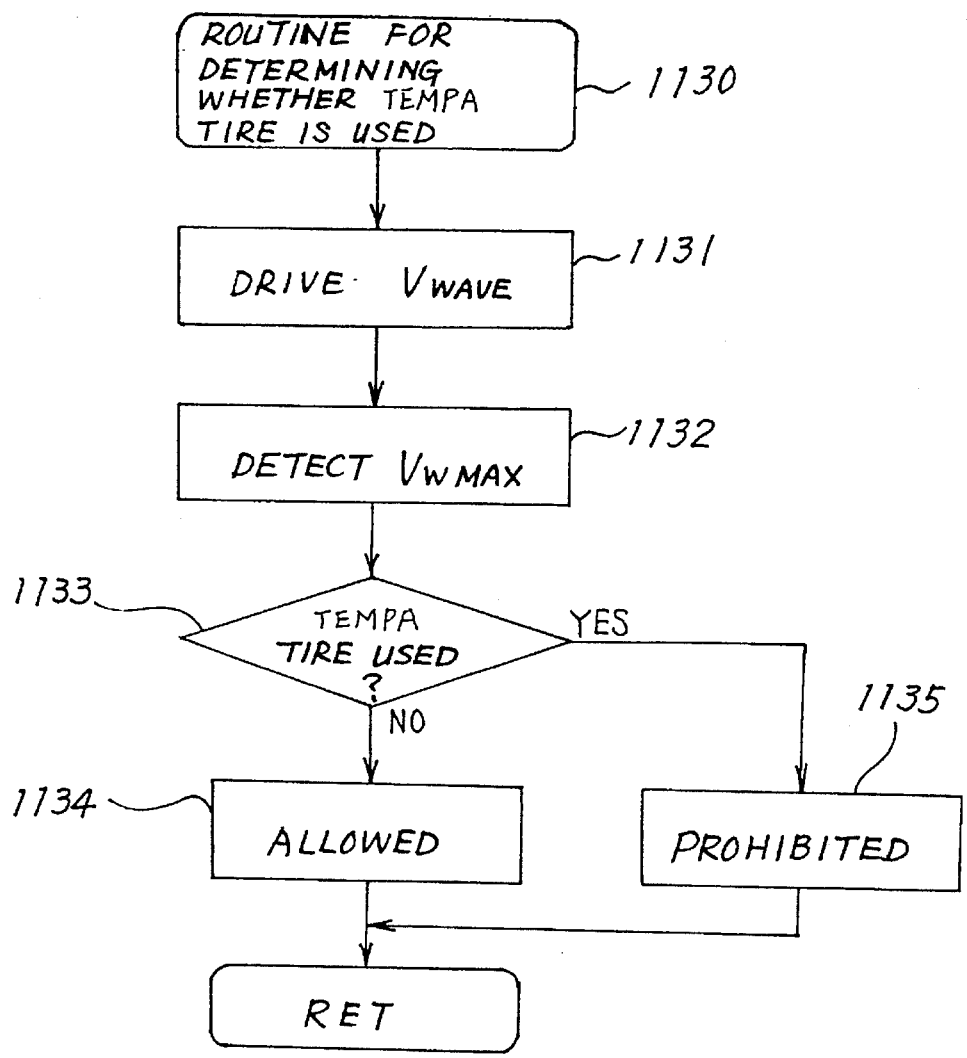
FIG. 47 is a flowchart showing a routine for determining whether a tempa tire (temporary use spare tire) is used, executed at a step 1130 in FIG. 42.

FIG. 47 shows a flowchart of a routine for determining whether the tempa tire is used, executed at the step 1130 in FIG. 42. In FIG. 47, a first step 1131 derives a mean speed $V_{WAVE}$ of the wheel speeds of the four wheels, using the following equation (25):

$$V_{WAVE}=(V_{WPR}+V_{WPL}+V_{WDR}+V_{WDL})/4 \qquad (25)$$

wherein, $V_{WPR}$ and $V_{WPL}$ represent right and left non-driven wheel speeds, respectively, and $V_{WDR}$ and $V_{WDL}$ represent right and left driven wheel speeds, respectively.

Subsequently, the routine proceeds to a step 1132 which detects a maximum wheel speed $V_{WMAX}$ among the wheel speeds of the four wheels. Thereafter, a step 1133 derives a difference between $V_{WMAX}$ and $V_{WAVE}$, and compares this difference with $K_{TEMP} \cdot V_{WAVE}/100$, wherein $K_{TEMP}$ represents a given coefficient. If $V_{WMAX}-V_{WAVE} \geq K_{TEMP} \cdot V_{WAVE}/100$, the step 1133 determines that the wheel corresponding to $V_{WMAX}$ wears the tempa tire so that the routine proceeds to a step 1135 where the execution of the step 1140 in FIG. 42 is prohibited for all the tires. On the other hand, if $V_{WMAX}-V_{WAVE} < K_{TEMP} \cdot V_{WAVE}/100$, the step 1133 allows the routine to proceed to a step 1134 where the execution of the step 1140 is allowed for all the tires.

It may be arranged that, when the wearing of the tempa tire is detected, the execution of the step 1140 is prohibited only for the tempa tire.

Referring back to FIG. 42, when the execution of the step 1140 is prohibited at the step 1130, the routine returns to the step 1020 in FIG. 39. On the other hand, when the execution of the step 1140 is allowed, the routine proceeds to the step 1140 where the tire pressure condition is determined for each of the tires based on the resonance frequency f derived at the step 1090 in FIG. 39.

At the step 1140, a deviation of the resonance frequency f from a reference frequency f0 corresponding to a normal tire pressure is derived (f0–f), and this deviation (f0–f) is compared with a given deviation Δf. This deviation Δf is preset with respect to the reference frequency f0 so as to correspond to an allowable lower limit pressure (for example, 1.4 kg/m²). Accordingly, when the step 1140 determines, that (f0–f)>Δf, the routine proceeds to a step 1150 as determining that the tire pressure drops below the allowable lower limit pressure. At the step 1150, the display unit 15 displays alarm for the driver per tire.

As appreciated from the foregoing description, in the tenth preferred embodiment, the condition which causes the erroneous detection of the tire pressure condition is detected so as to prohibit the detection of the tire pressure condition. Accordingly, the detection accuracy is improved.

Further, the frequency analysis (FFT calculation) is performed relative to the wheel speed data derived in the first to ninth preferred embodiments. Accordingly, the noise which is otherwise caused due to the nonstandard factor, such as, the processing failure of the signal rotor can be eliminated so that the accuracy of the determination of the tire pressure condition is highly improved.

It is to be understood that this invention is not to be limited to the preferred embodiments and modifications described above, and that various changes and modifications may be made without departing from the spirit and scope of the invention as defined in the appended claims.

What is claimed is:

1. An apparatus for detecting a speed of a rotating body in which a plurality of pulse signals are generated relative to each rotation of the rotating body, the apparatus calculating a speed of the rotating body including using a correction coefficient to correct a detection error in each pulse signal produced depending on rotation of the rotating body, said detection so as to derive a speed the rotating body based on the corrected pulse signals, the speed detecting apparatus comprising:

updating means for updating said correction coefficient, said updating means including:

average deriving means for deriving an average of respective periods of said plurality of pulse signals;

deviation deriving means for deriving a deviation between one of said pulse signal periods corrected by the correction coefficient and said average of periods;

adjusting means for adjusting a degree of influence of said deviation in updating the correction coefficient, relative to one said pulse signal, so as to derive an updating value for updating the correction coefficient; and correction coefficient deriving means for adding said updating value to the correction coefficient, thereby obtaining an updated correction coefficient.

2. The speed detecting apparatus as set forth in claim 1, wherein said adjusting means derives said updating value by multiplying said deviation by a sensitivity factor.

3. The speed detecting apparatus as set forth in claim 2, wherein said sensitivity factor is variably set according to an acceleration of the rotating body.

4. The speed detecting apparatus as set forth in claim 2, wherein the rotating body is a vehicle wheel, wherein said sensitivity factor is variably set according to a condition of a road surface over which the vehicle wheel runs.

5. The speed detecting apparatus as set forth in claim 2, wherein said sensitivity factor is switched between first and second values depending on an input condition of said plurality of pulse signals.

6. The speed detecting apparatus as set forth in claim 1, further comprising means for monitoring an input condition of said plurality of pulse signals so as to determine whether to update the correction coefficient.

7. The speed detecting apparatus as set forth in claim 1, wherein the rotating body is a vehicle wheel and the apparatus further comprises means for monitoring a road surface condition over which the vehicle wheel runs so as to determine whether to update the correction coefficient.

8. The speed detecting apparatus as set forth in claim 1, further comprising means for deriving an acceleration of the rotating body based on said derived speed of the rotating body.

9. The speed detecting apparatus as set forth in claim 1, wherein the rotating body is a vehicle wheel including an inflated tire, the apparatus further comprising:

means for extracting a resonance frequency component of an unsprung mass of said vehicle from said derived speed;

means for detecting a pressure of the tire based on said extracted resonance frequency component;

means for detecting an amplitude of said derived speed; and means for controlling detection of said tire pressure by said tire pressure detecting means according to a relationship between said detected amplitude and a threshold value.

10. The speed detecting apparatus as set forth in claim 1, wherein said rotating body is a vehicle wheel including an inflated tire, the apparatus further comprising:

means for extracting a resonance frequency component of an unsprung mass of said vehicle from said derived speed;

means for detecting a pressure of the tire based on said extracted resonance frequency component;

means for determining whether a spare tire is used; and means for controlling detection of said tire pressure by said tire pressure condition detecting means according to whether said spare tire determining means determines that a spare tire is used.

11. The speed detecting apparatus as set forth in claim 1, wherein said rotating body is a vehicle wheel including an inflatable tire, the apparatus further comprising:

means for extracting a resonance frequency component of an unsprung mass of said vehicle from said derived speed;

means for detecting a pressure of the tire based on said extracted resonance frequency component;

means for detecting a low-speed running condition of the vehicle based on said derived speed; and means for controlling detection of said tire pressure by said tire pressure condition detecting means in accordance with detection of said low-speed running condition.

12. The speed detecting apparatus as set forth in claim 1, wherein said rotating body is a vehicle wheel including an inflatable tire, the apparatus further comprising:

means for extracting a resonance frequency component of an unsprung mass of said vehicle from said derived speed;

means for detecting pressure of the tire based on said resonance frequency component;

means for determining whether a tire chain is used on the tire; and means for controlling detection of said tire pressure by said tire pressure condition detecting means according to the use of a tire chain on the tire.

13. The speed detecting apparatus as set forth in claim 1, wherein said rotating body is a vehicle wheel including an inflatable tire, the apparatus further comprising:

means for extracting a resonance frequency component of an unsprung mass of said vehicle from said derived speed;

means for detecting a pressure of the tire based on said extracted resonance frequency component;

means for detecting an acceleration acting on said vehicle; and means for controlling detection of said tire pressure condition in accordance with detection of said acceleration acting on said vehicle.

14. The apparatus as set forth in claim 9, wherein said means for controlling prevents detection of said tire pressure when said detected amplitude is greater than said threshold value.

15. The apparatus as set forth in claim 10, wherein said means for controlling prevents detection of said tire pressure when use of a spare tire is detected by said means for determining.

16. The apparatus as set forth in claim 11, wherein said means for controlling prevents detection of said tire pressure when said low-speed running condition is detected.

17. The apparatus as set forth in claim 12, wherein said means for controlling prevents detection of said tire pressure when use of a tire chain is detected.

18. The apparatus as set forth in claim 13, wherein said means for controlling prevents detection of said tire pressure when said detected acceleration is greater than a threshold value.

* * * * *